United States Patent
Gentle et al.

(10) Patent No.: US 10,071,791 B2
(45) Date of Patent: Sep. 11, 2018

(54) COMPARATIVE ICE DRIFT AND TOW MODEL ANALYSIS FOR TARGET MARINE STRUCTURE

(71) Applicants: Dave Gentle, Edinburgh (GB); Scott Cameron, Edinburgh (GB)

(72) Inventors: Dave Gentle, Edinburgh (GB); Scott Cameron, Edinburgh (GB); Terry Kennedy, Calgary (CA)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 14/741,455

(22) Filed: Jun. 17, 2015

(65) Prior Publication Data

US 2016/0001856 A1     Jan. 7, 2016

Related U.S. Application Data

(60) Provisional application No. 62/013,380, filed on Jun. 17, 2014.

(51) Int. Cl.
*B63B 43/18*     (2006.01)
*G08G 3/02*     (2006.01)
(Continued)

(52) U.S. Cl.
CPC .............. *B63B 43/18* (2013.01); *B63B 49/00* (2013.01); *G08G 3/02* (2013.01); *B63B 2211/06* (2013.01); *G01V 1/38* (2013.01)

(58) Field of Classification Search
CPC ................................ B63B 43/18; B63B 49/00
See application file for complete search history.

(56) References Cited

U.S. PATENT DOCUMENTS

| 3,721,950 A | 3/1973 | Jorgensen et al. |
| 3,725,918 A | 4/1973 | Fleischer et al. |

(Continued)

FOREIGN PATENT DOCUMENTS

| CA | 1210280 A1 | 8/1986 |
| CN | 201444353 U | 4/2010 |

(Continued)

OTHER PUBLICATIONS

Model Tests of IceBerg Towing, Kenneth Eik and Aleksey Marchenko, Cold Regions Science and Technology, 2010. Accessed from the web on Feb. 8, 2017 from http://www.sciencedirect.com/science/article/pii/S0165232X09002249.*

(Continued)

*Primary Examiner* — Jess Whittington
(74) *Attorney, Agent, or Firm* — Blank Rome LLP

(57) ABSTRACT

A marine threat monitoring and defense system and method protects a target vessel in icy or other marine regions. The system uses communications, user interfaces, and data sources to identify marine obstacles (e.g., icebergs, ice floes, pack ice, etc.) near a target vessel performing set operations (e.g., a stationed structure performing drilling or production operations or a seismic survey vessel performing exploration operations with a planned route). The system monitors positions of these identified marine obstacles over time relative to the target vessel and predicts any potential threats. When a threat is predicted, the system plans deployment of support vessels, beacons, and the like to respond to the threat. For example, the system can direct a support vessel to divert the path or break up ice threatening the target vessel.

26 Claims, 14 Drawing Sheets

(51) Int. Cl.
B63B 49/00 (2006.01)
G01V 1/38 (2006.01)

(56) References Cited

U.S. PATENT DOCUMENTS

| | | | |
|---|---|---|---|
| 3,971,018 | A | 7/1976 | Isbister et al. |
| 4,924,698 | A | 5/1990 | Echert et al. |
| 5,633,644 | A | 5/1997 | Schussler et al. |
| 5,660,131 | A | 8/1997 | Gulling et al. |
| 5,793,813 | A | 8/1998 | Cleave |
| 6,273,771 | B1 | 8/2001 | Buckley et al. |
| 7,047,114 | B1* | 5/2006 | Rogers ............... G08G 3/02 340/438 |
| 7,768,443 | B2 | 8/2010 | Imazu et al. |
| 2007/0210953 | A1 | 9/2007 | Abraham et al. |
| 2009/0167592 | A1 | 7/2009 | Kao et al. |
| 2009/0207020 | A1 | 8/2009 | Garnier et al. |
| 2009/0271054 | A1* | 10/2009 | Dokken ............. G01S 13/9307 701/21 |
| 2010/0226204 | A1 | 9/2010 | Gagliardi et al. |
| 2011/0188938 | A1 | 8/2011 | Nedwed et al. |
| 2012/0316769 | A1* | 12/2012 | Gagliardi ............. G08G 3/02 701/300 |
| 2013/0013207 | A1* | 1/2013 | Frejvall ............... G01W 1/10 702/3 |

FOREIGN PATENT DOCUMENTS

| | | |
|---|---|---|
| CN | 201788591 U | 4/2011 |
| EP | 2576337 A1 | 12/2011 |
| RU | 2133047 C1 | 10/1999 |
| RU | 2413958 C2 | 10/2011 |
| WO | 1996005562 A1 | 2/1996 |
| WO | 01/25724 A1 | 4/2001 |
| WO | 2011/027037 A1 | 3/2011 |
| WO | 2011149658 | 12/2011 |
| WO | 20120162310 A1 | 11/2012 |

OTHER PUBLICATIONS

Marchenko, Aleksey et al., "Iceberg towing in open water: Mathematical modeling and analysis of model tests", Cold Regions Science and Technology, vol. 73, Jun. 2010, pp. 12-31.
Murphy, Donald L. et al., "CIS-IIP iceberg model intercomparision", North American Ice Service, Jun. 2010.
International Search Report and Written Opinion received in corresponding PCT application No. PCT/US2015/036230 dated Oct. 19, 2015.
Power, D., et al., "State of the Art in Satellite Surveillance of Icebergs and Sea Ice," Offshore Technology Conference (OTC 22102), copyright 2011.
Edmond, C., et al., "State of the Art in Satellite Surveillance of Icebergs and Sea Ice," Offshore Technology Conference (OTC 22102), copyright 2011.
Hanvig, K., et al., "Near Real Time Iceberg Detection and Sea Ice Classification Using Satellites—Status, Potential and Limitations for the Offshore Industry," Offshore Technology Conference (OTC 22104), copyright 2011.
Hamilton, J., et al., "Ice Management for Support of Arctic Floating Operations," Offshore Technology Conference (OTC 22105), copyright 2011.
Fissel, D., et al., "Real-Time Pack Ice Monitoring Systems—Identification of Hazardous Sea Ice Using Upward Looking Sonars for Tactical Support of Offshore Oil and Gas Projects," Offshore Technology Conference (OTC 22106), copyright 2011.
Backman, A., et al., "Green Management—Enabling Arctic Exploration and Reducing Its Environmental Impact," Offshore Technology Conference (OTC 22107), copyright 2011.
Magnell, B. et al., "Waves, Ice Draft and Floe Size Measurements in the Beaufort Sea Using Bottom-Mounted Ice, Wave and Current Acoustic Profilers," Offshore Technology Conference (OTC 22108), copyright 2011.
Reunion Consultiva Del Tratado Antartcio, "An Antarctic Vessel Traffic Monitoring and Information System—Buenos Aires Jun. 20-Jul. 1, 2011," obtained from www.asco.org, undated.
ExactEarth, "Use Case: Arctic Monitoring," Brochure obtained from www.exactearth.com, copyright 2011.
ExactEarth, "Applications: Use Cases," webpage generated from www.exactearth.com/applications/use-cases/, generated May 5, 2012, copyright 2012.
Subcommitte on Ship Design & Equipment, "Vessel Monitoring and Traffic Systems," dated Jan. 14, 2011.
Environmental Systems Research Institute, Inc., "ESRI Shapefile Technical Description," ESRI White Paper, copyright 1997, 1998.
Provincial Aerospace, Ltd., webpages for "Products and Services at a Glance," "Ice Management Group," "Ice Management," "Meteorological Management," and "The RAVEN Project," obtained from www.provincialaerospace.com/ on May 22, 2012, copyright 2010.
Provincial Aerospace, Ltd., "Excellence in maritime surveillance and search and rescue," Brochure obtained from www.provincialaerospace.com/ on May 22, 2012, undated.
Diekmeyer, P., "Provincial Aerospace," reprinted from Canadian Defence Review, Oct. 2010.
Safer, A., "The Sky's the Limit @ PAL," Reprinted from Marine Technology Reporter, Nov./Dec. 2011.
Larkin, F. K., "From the Rock to the World: A position report on St. John's, Newfoundland's Provincial Aerospace," obtained from www.wingsmagazine.com, generated May 22, 2012, undated.

* cited by examiner

COMPARATIVE ICE DRIFT AND TOW MODEL ANALYSIS FOR TARGET MARINE STRUCTURE

CROSS-REFERENCE TO RELATED APPLICATIONS

This application claims the benefit of U.S. Provisional Appl. 62/013,380, filed 17 Jun. 2014, which is incorporated herein by reference. This application is also co-pending with U.S. application Ser. No. 14/077,467, filed 12 Nov. 2013, and entitled "Marine Threat Monitoring and Defense System," which is incorporated herein by reference in its entirety.

BACKGROUND OF THE DISCLOSURE

Oil and gas production operations in new regions, such as the Arctic, have dramatically increased over the past few years. This increasing activity makes it more likely that fixed or floating production platforms, drill ships, and other structures will be used in these regions. A concern for these types of structures in such regions is potential for damage caused by objects that are uncontrolled and floating or submerged in the water, such as flotsam, jetsam, debris, icebergs, ice floes, and other threats ("marine obstacles"). In icy regions, for example, large icebergs and strong ice floes can pass through survey, production, and drilling areas. Although production vessels may be designed to handle some impacts from such marine obstacles, the vessels may have limits on how long impacts can be sustained and what force of potential impacts that can be handled safely.

For these reasons, operators on a production vessel or other structure will need to anticipate and defend against threats from obstacles so the production vessel can be sufficiently protected. If conditions become too dangerous, operators may also need to suspend operations and move the production vessel away until it is safe to return to normal operations. Being able to do so reliably can be of utmost importance to operators.

To monitor conditions in an icy region, operators can use iceberg drift models. Several iceberg drift models have been developed by ice engineers and scientists. Normally, the existing models are specific to a particular area of ocean. As is typical, the iceberg drift models are run onshore at data centers, and results are sent to a vessel on a daily basis or as required. This obviously requires reliable communications so data and predictions can be sent back and forth.

For example, various ice drift prediction models are available from C-Core, National Research Council of Canada (NRC), and others. Ice berg observations are obtained using airplane reconnaissance, satellite imagery, radar or manual observation, and the observations obtained offshore are sent to an onshore processing center. Then, the drift prediction model is run onshore within the processing center. Because offshore observations from vessels and the like are sent back to the processing center onshore, the drift model cannot be run if communications are down. Either way, the drift prediction model is often only run once per day in the onshore center, and the output (an image of the predicted drift for all tracked icebergs) is then sent to the vessels for review. Again, if communications are down, then sending the analysis can be hindered.

The subject matter of the present disclosure is directed to overcoming, or at least reducing the effects of, one or more of the problems set forth above.

SUMMARY OF THE DISCLOSURE

Drift and towing models are analyzed to defend a target marine structure and its set operation from threats, disruptions, damage, and the like. A modelling system allows users to update observations, compare models, and display various performance measures to both predict the course of ice and to assess performance of the models.

Although the present disclosure discusses drift and tow analysis with respect to ice, such as icebergs, ice floes, etc., it will appreciated that the teachings of the present disclosure can apply to debris or anything else on/near the water's surface that may pose a threat to a target marine structure. Additionally, although the present disclosure focuses on ice drift and tow models, other types of models can be used in a similar fashion.

The modelling system has a prediction model "framework" that allows system users to "plug in" and use various models. The models include drift models for calculating future or subsequent drift positions of an obstacle in the vicinity of the target marine structure. For example, based on acquired data of current conditions offshore, the system then predicts ice drift for each obstacle using each model that calculates the passive drift of the obstacles from current or given positions under the prevailing conditions. This processing is preferably done offshore in the field using a planning tool of the disclosed system. As new data is entered into the system or after a certain time lapse (for instance the current predictions may have a 1-hr granularity), the system pushes all current iceberg observations into all drift models.

In addition or as an alternative to calculating drift, the models can include tow models for calculating future or subsequent tow positions of an obstacle in the vicinity of the target marine structure. For example, based on acquired data of current conditions offshore, the system can predict future or subsequent tow positions for each obstacle using each model that calculates active diversion of the obstacles from current or given positions under the prevailing conditions. This processing is preferably done offshore in the field using the planning tool of the disclosed system.

The predicted results of each model can then be shown on interactive system maps, for example, as different layers. The performance (or error) over time (versus the real observations and drift) of each model is displayed, graphed, tracked, and reported. The system user can then decide, based on model performance, which model has given the best predictions and can mark this model as the optimal model. The optimal model can then be used for the final predictions, alarm zone monitoring, planning of iceberg towing operations, and other purposes.

The system automates the tasks in the field by bringing together the models within an automated command and control system. In one benefit, the system aids in the selection of (or automatically selects) the most efficient method of iceberg avoidance for a target marine structure by selecting a deflection method and timing relative to external conditions that can save fuel and make ice management operations more efficient.

In one embodiment, a marine threat modelling method is used for a target marine structure conducting a set operation in a body of water. The method involves monitoring with a computer system at least one given position of at least one obstacle drifting in a vicinity of the target marine structure as the target marine structure conducts the set operation in the body of water. The method involves modeling with the computer system at least two subsequent positions of the at least one obstacle over time from the at least one given position relative to the target marine structure by using at least two models for calculating movement of the at least one obstacle. The method further involves presenting with the computer system the at least two subsequent positions of the at least two models for comparison to one another.

For example, the marine threat modelling method can model at least two subsequent drift positions of the at least one obstacle over time relative to the target marine structure by using at least two drift models for calculating passive drift of the at least one obstacle applied to the at least one given position. In addition or in the alternative, the marine threat modelling method can model at least two subsequent tow positions of the at least one obstacle over time relative to the target marine structure by using at least two tow models for calculating active diversion of the at least one obstacle applied to the at least one given position.

In another embodiment, a programmable storage device has program instructions stored thereon for causing a programmable control device to perform a marine threat monitoring method as noted above and disclosed herein.

In yet another embodiment, a marine threat modelling system is used for a target marine structure conducting a set operation in a body of water. The system can have communication equipment obtaining information about one or more obstacles in a vicinity of the target marine structure. The system can have memory storing the obtained information and storing at least two models for calculating movement. Processing equipment of the system can be operatively coupled to the communication equipment and the memory.

The processing equipment can be configured to monitor at least one given position of at least one of the obstacles drifting in the vicinity of the target marine structure as the target marine structure conducts the set operation in the body of water. The processing equipment can also be configured to model at least two subsequent positions of the at least one obstacle over time relative to the target marine structure by using the at least two models applied to the at least one given position. The processing equipment can further be configured to present the at least two subsequent positions for comparison to one another.

The foregoing summary is not intended to summarize each potential embodiment or every aspect of the present disclosure.

DETAILED DESCRIPTION

1) Overview of Modelling System

Figure 1:
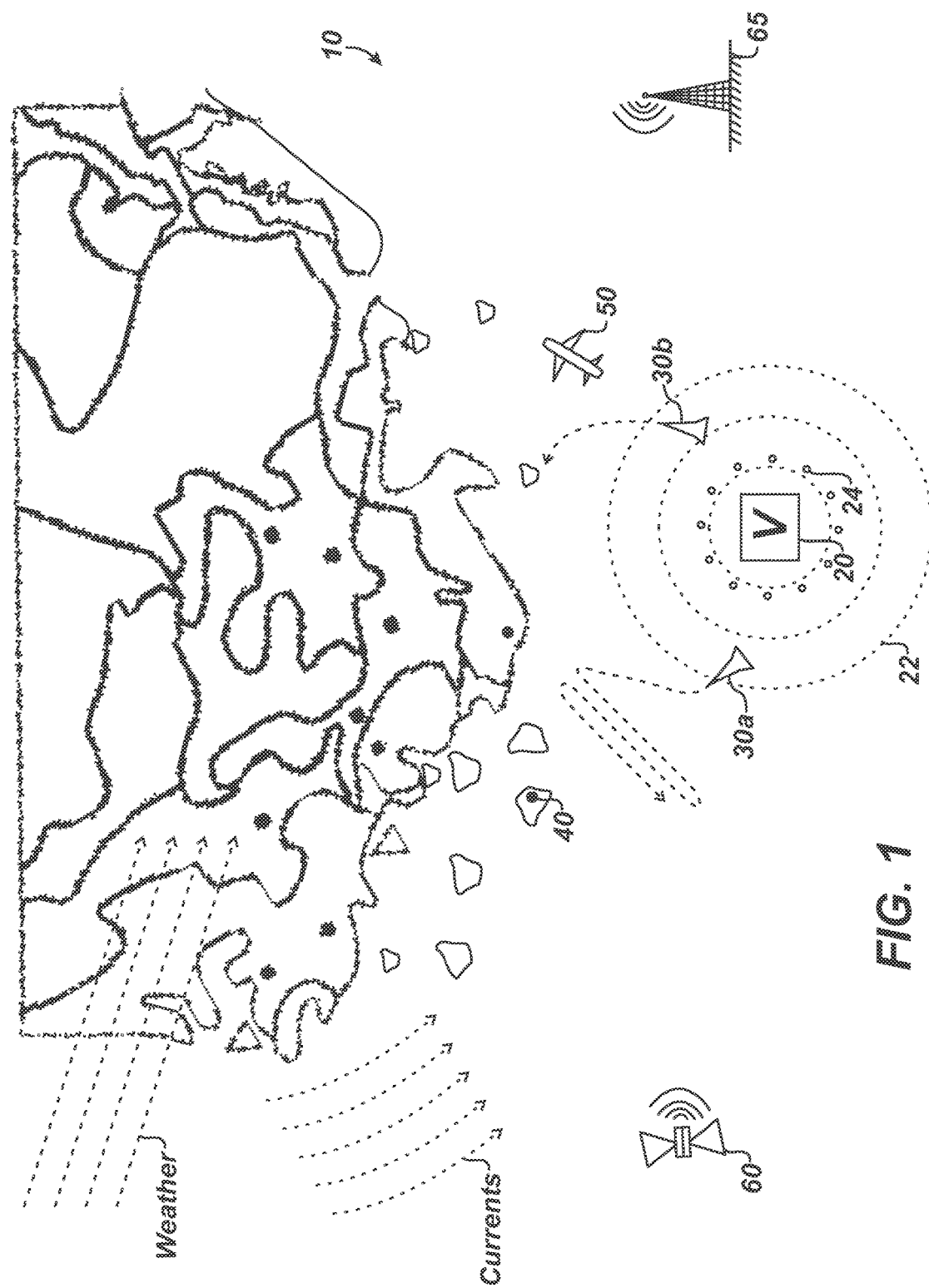
FIG. 1 schematically shows a marine threat modelling system according to the present disclosure.

As noted previously, protecting attached, fixed, or stationary marine structures or marine vessels with planned movements or routes from marine obstacles and impacts presents a significant challenge to drilling, production, and exploration operations in some marine regions, such as the Arctic. To meet this challenge, operators on such a structure can use a marine threat modelling system 10 as schematically illustrated in FIG. 1. The modelling system 10 protects a target marine structure 20 in a region, such as the Arctic, having floating and/or submerged objects that drift in the ocean and threaten the structure 20. The modelling system 10 can be incorporated with, part of, or used with a marine threat monitoring and defense system as disclosed in co-pending U.S. application Ser. No. 14/077,467, which is incorporated herein by reference in its entirety.

In general, the target marine structure 20 can be a production vessel, a production platform, a drilling ship, a wellhead, a riser, a seismic survey vessel, or other marine structure or vessel used in drilling, production, or exploration operations at sea. The structure 20 can be floating or fixed and can be permanently or temporarily affixed to the sea floor. Therefore, the structure 20 can be stationed (i.e., "set") for drilling, tanker loading, well workover, subsea maintenance, or other drilling or production operations in a body of water. For exploration, the structure 20, such as a seismic vessel, can traverse an area of exploration with a planned (i.e., "set") route for seismic acquisition or other such exploration operation. In any event, the structure 20 typically operates in one specific location for a period of time to perform its drilling, production, or exploration operations, which makes it vulnerable to moving threats from marine obstacles in the water. For the purposes of description, the structure 20 is referred to herein as a target vessel, but the structure 20 can be any of the several types of structures, vessels, platforms, and the like that are known and used for drilling, production, and exploration in water ways.

As discussed in the examples below, such a target vessel 20 can be used in icy regions having glacial ice, pack ice, ice floes, icebergs, and other ice obstacles. However, the vessel 20 and elements of the disclosed system 10 can be used in other locations having debris, plants, flotsam, jetsam, or other obstructions or obstacles submerged and/or floating in the water that can interfere with the drilling, production, or exploration operations of the vessel 20. The disclosed system 10 as described in the examples below can be used to monitor and defend the target vessel 20 in any of these situations in a similar fashion as discussed below.

Being used in an icy region, for example, the target vessel 20 is prone to threats from drifting marine obstacles, namely flotsam, jetsam, debris, icebergs, ice floes, loose pack ice, and other hazards, that can impact the vessel 20 and cause structural damage beyond the vessel's limitations or disrupt the set operations. The marine obstacles may be moving freely in the area around the target vessel 20, and weather conditions, ocean currents, wave height, wind direction and speed, and other environmental factors can influence the movements (drift) of these obstacles. Additionally, icy regions may have pack ice of various thickness and layers. Portions of this pack ice may break loose over time and flow in ocean currents to threaten the vessel 20. Therefore, being able to monitor and track ice can be beneficial for protecting the target vessel 20 in such a region.

To help operators improve safety and operations (e.g., drilling, production, or exploration), the modelling system 10 monitors, forecasts, and proactively guards against various threats in the icy region. To achieve these purposes, the system 10 has various support vessels 30, tracking beacons 40, surveillance vehicles 50, and communication equipment (not specifically indicated), among other features to be discussed in more detail later.

In the system 10, equipment on the target vessel 20 (or on any other vessel 30 or other location) can act as a master control, and it communicates directly with each of the support vessels 30 and other components of the system 10. In turn, the various support vessels 30 and other components to be positioned, controlled, and tracked by the system 10 run software features to perform tasks and obtain data for protecting the target vessel 20. Finally, the vessels 20/30 and other components communicate data and instructions between one another to proactively act against threats from marine obstacles.

Briefly, system operators control the system 10 to protect the target vessel 20 against incoming ice threats. As set operations (drilling, production, or exploration) proceed and threats arise, the system 10 helps manage and control operations of the support vessels 30 tasked with protecting the target vessel 20 and helps track and monitor ice as it drifts relative to the target vessel 20. As part of this management, the system 10 obtains and uses information about ice formations and locations from various satellites 60, such as weather, imaging, and GPS satellites. Additionally, the system 10 can obtain images and other information using remote vehicles 50, such as unmanned aviation vehicles or the like to take photographs or weather information. Moreover, the system 10 can obtain information from remote base stations 65 on land, such as weather stations and the like.

The modelling system 10 then uses software, communication systems, satellite and weather imaging, and the like so system operators can visualize and manage the various obstacles around the target vessel 20 and can allocate and direct the various support vessels 30 and other components to track and deal with those obstacles. To assist in the visualization and management, the system 10 monitors ocean currents, wave height, weather conditions (temperature, wind direction and speed, etc.), debris, and ice in the vicinity of the target vessel 20 in real time, and this information is used to forecast movements (i.e., drift) of ice and changes in the environment.

Then, over the course of operations, the system 10 tracks the risks from debris and ice threats and forecasts how those risks might proceed going forward in time. The forecasting can be based on information such as how local ocean currents usually operate, how such currents are operating now, where icebergs or floes are currently located, what is the confidence in any forecast, etc. Additionally, if the target vessel 20 is used for exploration operations, such as seismic surveying, the target vessel 20 has a planned route or track to run. In this instance, the forecasting can be further based on the target vessel's current speed, direction, route, planned track, etc.

The forecasting as disclosed herein analyzes the drift of obstacles using drift models and can further use tow models for towing obstacles. The drift and tow model analysis can then be used for a number of purposes. For example, the analysis can be used in the field by system users to find and use the best performing drift and tow models to deal with obstacles. Once the system 10 is configured, running of each model can be automated and presented to the system user, allowing the user to concentrate on the task at hand. The analysis can also be used onshore as a post season review to determine which model performed the best over the course of the previous season(s). Developers of the models can then refine the drift and tow models to test and calibrate new or modified models for use in the future.

Based on the tracked risks, forecasts, and models, the system 10 can then identify and automatically suggest various scenarios to improve the protection of the target vessel 20 by indicating whether obstacles can be moved or broken up in a suitable time frame, by indicating when to disconnect and move the target vessel 20 from a forecasted threat, etc.

Through this monitoring, tracking, forecasting, and modelling, the system 10 obtains and presents a variety of data to the system operators for analysis. Data from direct observations, sensors, and beacons 40 can report real-time location information of the support vessels 30, icebergs, ice floes, ocean currents, wind speed and direction, and other variables of interest. The sensors and beacons 40 can be deployed by hand or by air, dropped from a support vessel 30, a helicopter, an R.O.V. drone, etc. Sensors used can include ice profilers, such as upward looking sonar devices to detect the presence, thickness, motion, and other feature of sea ice. Examples of such devices include Ice Profiler Sonar and Acoustic Doppler Current Profiler that deploy in water at 25 to 60-m below the surface. Additional data for analysis includes, but is not limited to, satellite ice imagery, Environmental Systems Research Institute, Inc. (ESRI) shape files, manually defined obstacles with assigned headings and level of threat, marine current/ice flow prediction models, logged ocean current data, vessel positions and exclusion zones, standard ship and ice radar readings, and automatic identification algorithms. In predicting movements of ice in the water, the system can use ice profilers mounted on the sea floor that can measure ice thickness (draft), floe size, and other measurements.

Combining all of this information, the system operators can then use the system 10 to direct the support vessels 30 to perform selected tasks, such as running defensive marine obstacle breaking routes, physically diverting marine obstacles, visually observing marine obstacles, deploying remote monitoring beacons 40, etc. In the end, the system 10 seeks to identify risks as early as possible, forecast where those risks will move (drift) over time, and identify protective measures for dealing with the threats so the target vessel 20 can continue set operations. Yet, the system 10 can also identify the level of a threat and what time frame may be need to cease set operations and possibly move or evacuate the vessel 20.

As discussed in more detail below, system operators use a planning tool of the system 10 to proactively monitor the environment, evaluate risks, model drift and tow of obstacles, and make necessary decisions, such as commanding support vessels 30 to intercept marine obstacles that pose a risk and commanding support vessels 30 to perform scouting and icebreaking duties on a predefined track (e.g., "picket fencing," "racetrack," elliptical, orbital, and other patterns). As shown in FIG. 1, for example, the support vessel 30a has been tasked with running a picket fence pattern to thwart off threats from ice by breaking up ice and being prepared to move (i.e., tow) obstacles when needed. The operator can also command support vessels 30 to observe and tag identified marine obstacles that pose a risk. For example, the other support vessel 30b in FIG. 1 has been tasked with observing and tagging a particular iceberg. Reconnaissance can also be carried out by remote vehicles 50, such as drones, which can drop beacons 40, take photographs of ice features, make weather measurements, and perform other duties around the target vessel 20. These and other details of the system 10 are discussed below.

2) Components of Modelling System

Figure 2:
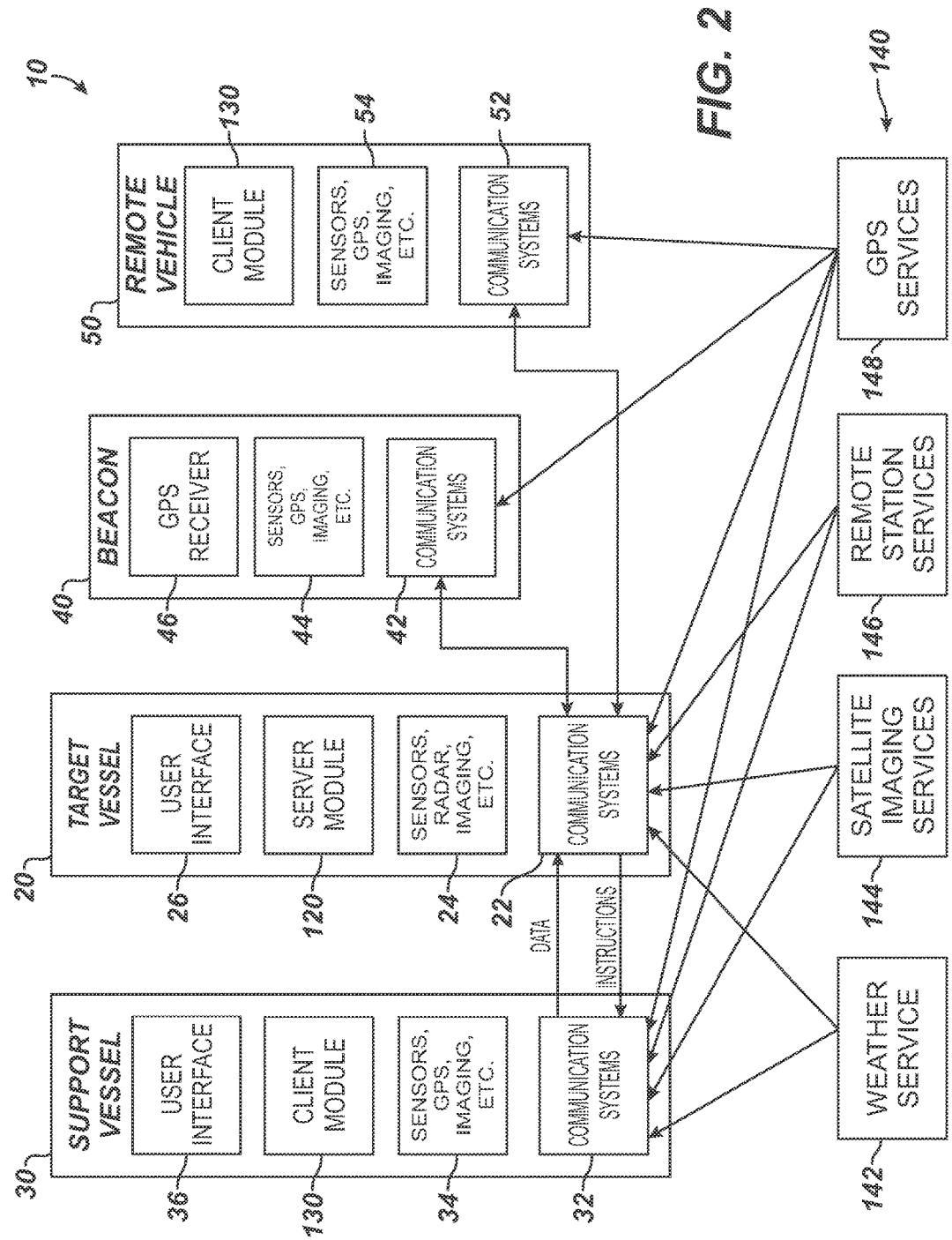
FIG. 2 schematically shows some of the components of the modelling system, including a target marine structure, a support vessel, a beacon, and a remote vehicle, along with various services used by the system.

With an understanding of the overall modelling system 10, discussion now turns to additional details of the system's components. FIG. 2 schematically shows some of the components of the modelling system 10, including a target marine structure 20, a support vessel 30, a beacon 40, and a remote vehicle 50. Also depicted are various services 140 used by the modelling system 10.

As will be appreciated, other related components can also be used and may be based on some of the same concepts detailed below. Moreover, a given implementation may have more or less of these components. Further details related to the modelling system 10 as shown in FIG. 2 are disclosed in the incorporated U.S. application Ser. No. 14/077,467 and are not repeated here for brevity.

3) Client-Server Architecture

With an understanding of the overall modelling system 10 and its components, discussion now turns to additional details of the system's computer architecture. As mentioned previously, the system 10 uses a client-server based architecture. Server modules 120 can be used on the target vessel 20, and client modules 130 can be used on the support vessels 30 and other components. Alternatively, server modules 120 can be used on the support vessels 30, and client modules 130 can be used on the target vessels 20 and other components. Being client-server based, the disclosed system 10 can be used on a single workstation on a single vessel or can be used on multiple servers on multiple vessels.

Figure 3B:
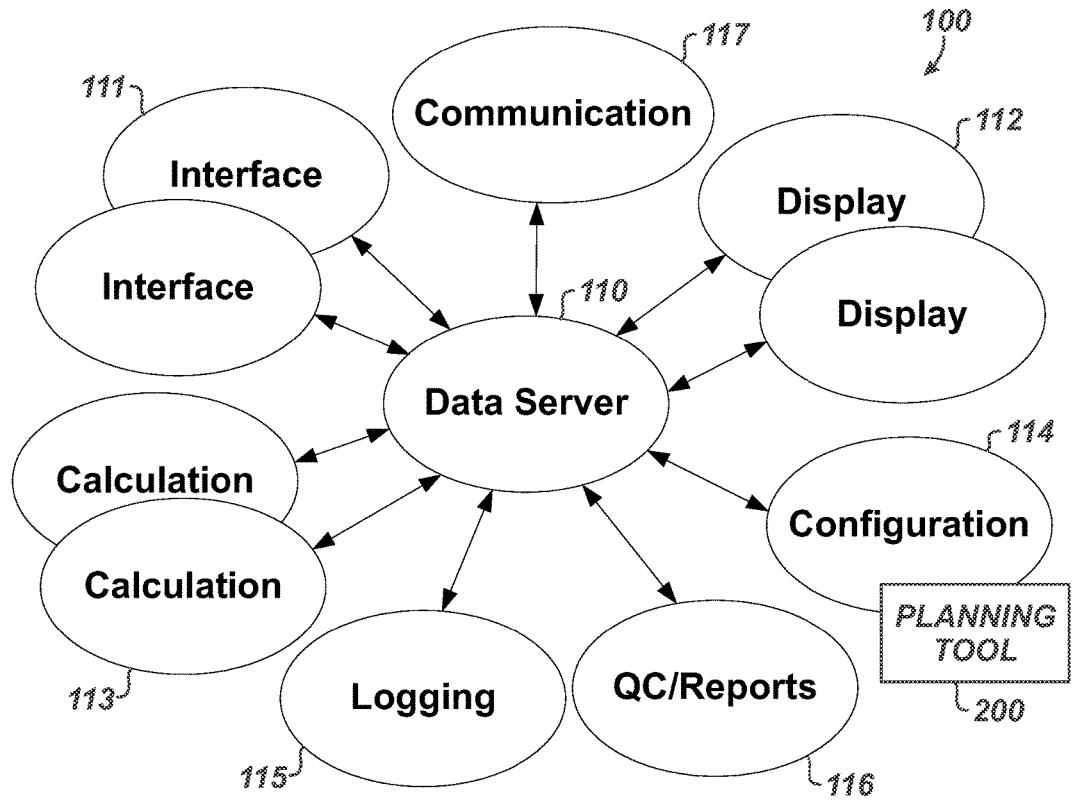
FIGS. 3A-3B show features of a client-server based architecture for the modelling system.
Figure 3A:
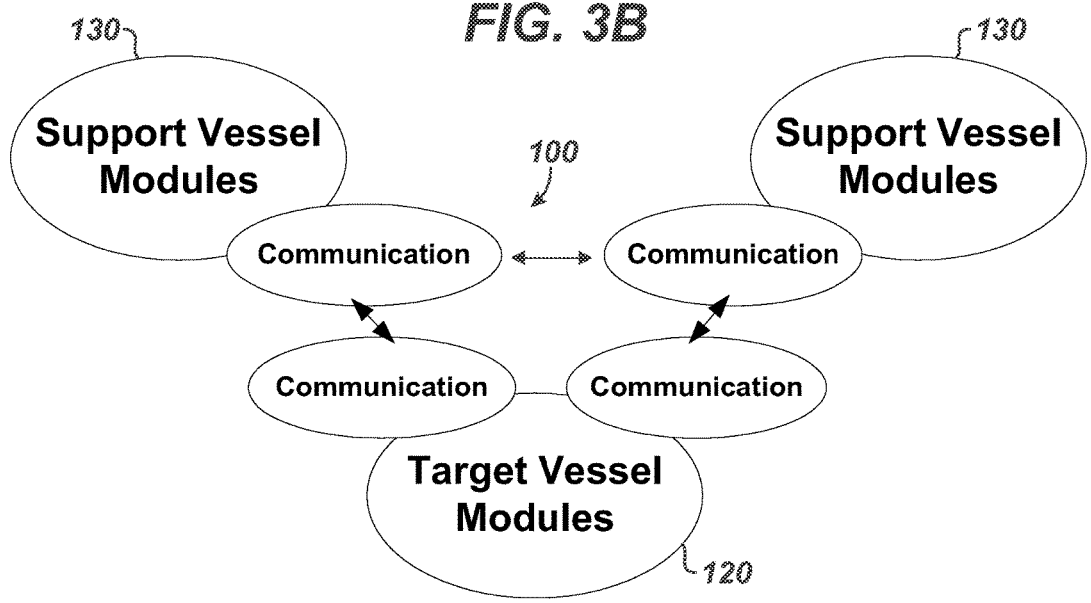

For illustrative purposes, FIG. 3A schematically shows the system's client-server architecture 100 in block diagram form, and FIG. 3B schematically shows various processes of the client-server architecture 100 that can be distributed and shared across the modelling system 10 and its modules 120 and 130. Further details related to the client-server architecture 100 of FIGS. 3A-3B are disclosed in the incorporated U.S. application Ser. No. 14/077,467 and are not repeated here for brevity.

Of particular note here are calculation processes 113 and configuration processes 115. The calculation processes 113 compute vessel positions, carry out collision detection, predict paths of vessels and obstacles, run drift and tow model calculations, and perform other calculations. Predicting paths of obstacles using drift and tow models as disclosed herein can help operators and the system 10 to assess threats and risks and to implement tasks to deal with them. Also, by performing collision detection between vessels 20/30 and ice obstacles, the calculation processes 113 can generate alarms if potential collisions are predicted.

The configuration processes 114 allow operators to configure the system's operation, such as define the data interfaces, displays, workstations, support vessels, logging locations, communication parameters, and any exception criteria for alarms. In addition to operating in conjunction with the target vessel 20, each support vessel 30 can be set up with system components that can operate independently from the target vessel 20. Notably, the configuration processes 114 have a planning tool 200. As discussed below, the planning tool 200 is a graphical application that allows system operators to view operations and define a protection plan for the target vessel 20. The planning tool 200 is open to interface with multiple drift models for ice flow/drift and with multiple tow models. The modelling is preferably done in field to give immediate results to system operators and ice experts on one or more of the vessels 20/30.

4) Processing Methodology

Figure 4A:
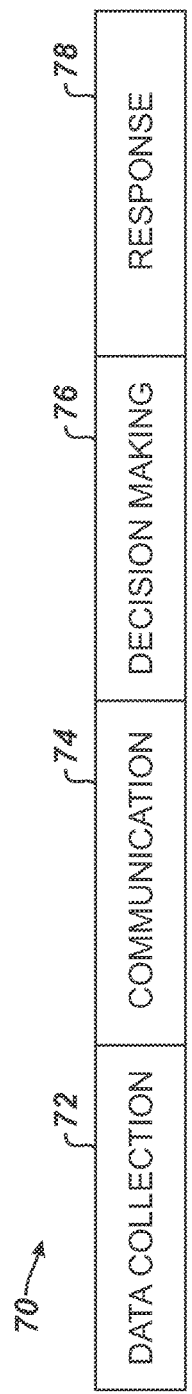
FIGS. 4A-4B schematically show a general processing and data handling methodology for the modelling system.

The components of the disclosed modelling system 10 using the client-server architecture 100 as outlined previously follow a general processing methodology as schematically illustrated in FIG. 4A. As shown, the system's processing methodology 70 involves data collection (Block 72), communication (Block 74), decision-making (Block 76), and threat response (Block 78).

Figure 4B:
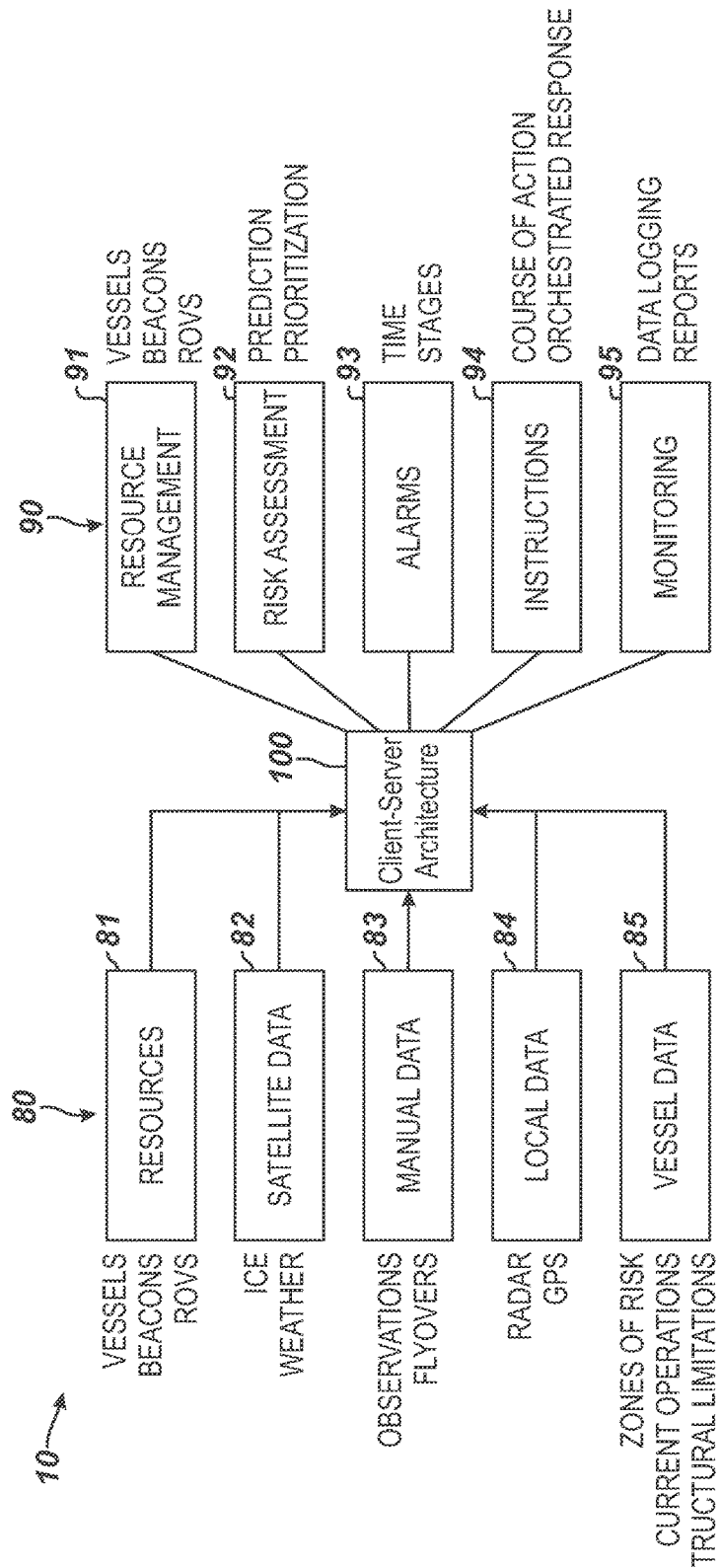

As an initial matter and as shown in FIG. 4B, the client-server architecture 100 has various resources and data sources 80, which are involved in the data collection (Block 72) of the system's processing methodology 70 of FIG. 4A. As noted previously, some of the resources 81 include the vessels, beacons, remote vehicles, and other components for collecting data for the client-server architecture 100. Satellite data 82 can come from weather, ice imaging, and GPS satellites, and manual data 83 can come from visual observations, flyovers, and the like. The client-server architecture 100 can also obtain local data 84 at the target vessel (20; FIG. 1), from radar, GPS, and the like.

Finally, the target marine structure or vessel (20) has its own electrical, alarm, and operational systems, and this target vessel data 85 can be used by the client-server architecture 100. Furthermore, any current operations performed on the vessel (20) and the vessel's structural limitations can be part of the vessel data 85 available to the client-server architecture 100. For example, the target vessel (20) may be able to handle various levels of wind, current, and ice over a certain period of time, but may have structural limits that need to be accounted for.

As another example of vessel data 85, current operations (drilling, production, or exploration) being performed with the target vessel (20) may dictate how much time is needed to shut down the vessel (20) and move it to another location if needed. In other words, the vessel (20) may need to halt drilling, to pull a riser, or to pull in seismic streamers before the vessel (20) can be moved or redirected, and these operations can take a particular amount of time to complete. If these operations are occurring on the vessel (20), any time frame for risk assessment can account for the length of time to complete the "set" (i.e., stationed or planned) operations, to shut down the operations (e.g., stop drilling, remove a riser, reel in seismic streamers, etc.), to move the vessel (20), to evacuate the personnel, and the like. Any time intervals involved will depend on the type of structure (i.e., vessel 20) involved, the type of "set" (i.e., stationed or planned) operations being performed (e.g., drilling, production, exploration, etc.), and other factors.

To obtain and transfer all of this collected data (Block 72) as shown in FIG. 4A, the client-server architecture 100 uses various forms of communication (Block 74). As noted throughout, the various components of the system 10 can use any of a number of available forms of communication (Block 74) for the environment of interest. In general, satellite or radio communications can be used depending on weather conditions, and other forms of wireless communication using relay stations and the like can be used. As will be appreciated, many types of communication systems can be used.

Having the collected data (Block 72) communicated to it, the client-server architecture 100 goes through various decision-making processes (Block 76) to develop a managed response (Block 78). The decision-making process (Block 76) can use predictive algorithms, decision trees, risk weighting, and other techniques and can be handled by automatic computer processing and human intervention to handle threats to the target vessel 20 from ice and the like.

In particular, the architecture 100 in the decision-making and response processes (Blocks 76 and 78) manages the resources and data sources 80 and their data collection (Block 72) by tracking, directing, and configuring the vessels 30, beacons 40, and the like to collect data and address threats. Then, the client-server architecture 100 can provide operators on the vessels 20/30 with results 90, such as resource management 91, risk assessment 92, alarms 93, instructions 94, and monitoring 95.

In the resource management 91, for example, system operators can manage various tasks and operations of the vessels 30, beacons 40, vehicles 50, and other resources around the target vessel 20. As operations continue, results for risk assessment 92 can predict threats, prioritize tasks, and perform other assessments, including drift and tow model analyses. Then, depending on the threats and their severities, alarms 93 can be triggered based on various time intervals or stages to warn operators of threats to the target vessel 20.

Finally, operators can relay instructions 94 to other components of the system 10, such as vessels and the like, and can direct a course of action and orchestrate a response to threats. In the monitoring 95, the client-server architecture 100 monitors the entire operation by logging the data collected and producing reports and the like for further analysis.

5) Operation of System

With an understanding of the components of the system 10, its architecture 100, and the various processes used, we now turn to discussion of how the modelling system 10 operates to protect a target vessel 20 from threats in a given region. Again, the current example focuses on threats encountered in an icy region, but the system 10 can be applied to any marine region in which threats can be encountered.

Figure 5:
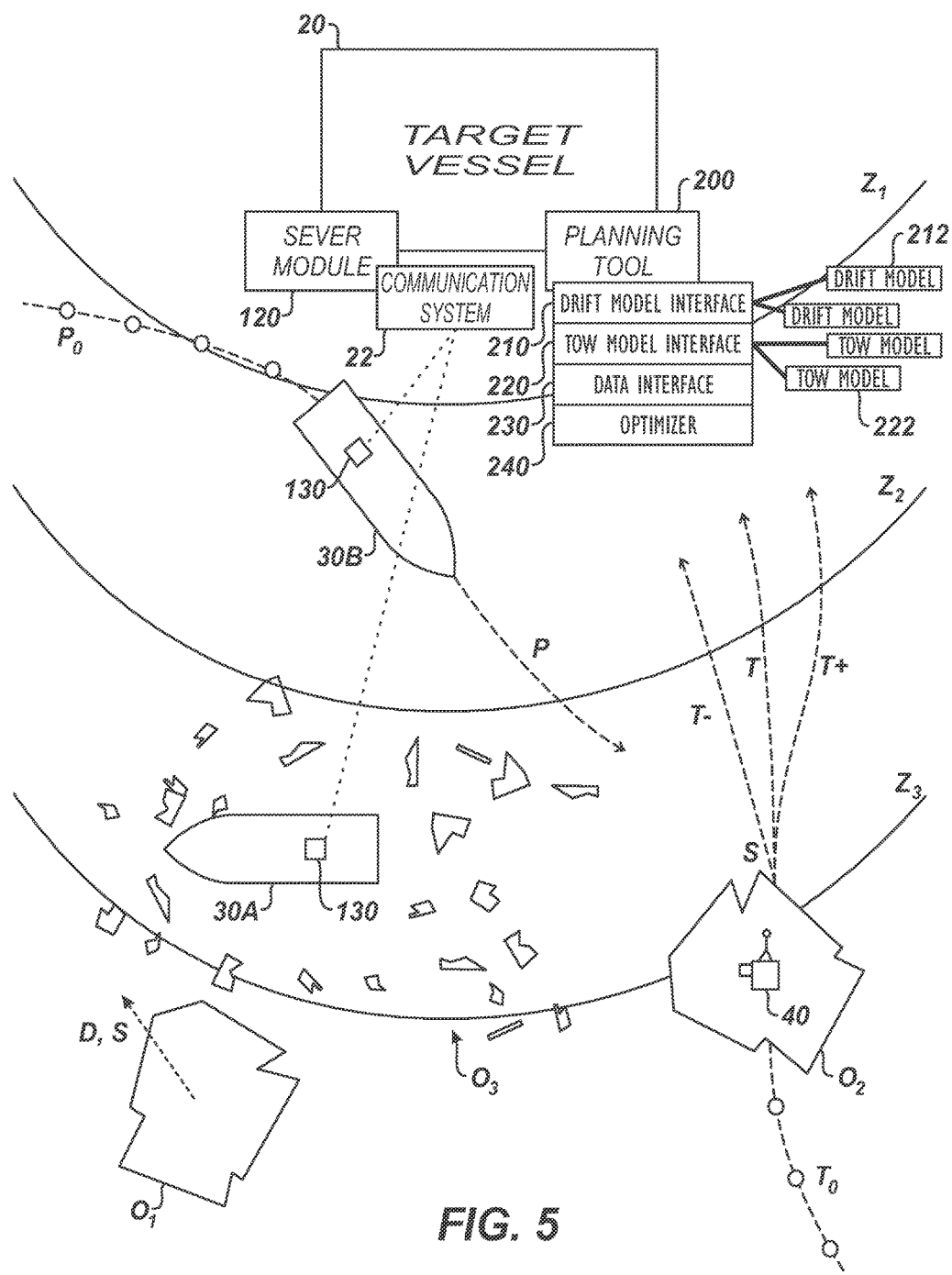
FIG. 5 conceptually shows components of the modelling system in an example arrangement during operations.

To help illustrate how threats are identified and monitored and how tasks and plans are generated to deal with them, we turn to the example shown in FIG. 5, in which components of the system 10 are conceptually shown along with some possible graphical elements that may be displayed in user interfaces of the system 10, such as in the planning tool 200 as described herein. The target marine structure or vessel 20 is shown with only some of its components, including server module 120, communication system 22, and planning tool 200, but the other components would be present as well. These components, such as the planning tool 200, need not be specifically located at one location (i.e., the target vessel 30) and can be instead distributed or located elsewhere in the system.

Two support vessels 30a-b are also shown in this example with each having a client module 130. Finally, various ice obstacles O are shown in this example, including a first obstacle $O_1$, a second obstacle $O_2$, and various smaller obstacles $O_3$. One of these obstacles $O_2$ has a beacon 40 deployed on it.

In general, the marine obstacles O can be flotsam, jetsam, debris, icebergs, ice floes, and other floating threats to the target vessel 20 carried by ocean and with currents, and the marine obstacles O can be defined as single or multi-point objects in the system 10. Each marine obstacle O in the system 10 can have a set of attributes associated with it—some of which can be displayed as described later. The attributes can be obtained in various ways, such as manually entered coordinates; graphically defined information with a display screen and mouse control; automatically obtained from radar targets, satellite images, or a beacon 40; and other ways.

At the target vessel 20 and the support vessels 30, the server and client modules 120/130 can be used to create and delete the various marine obstacles O in the vicinity of the target vessel 20. The obstacle information is preferably passed automatically between each of the vessels 20/30. For consistency across the system 10, the obstacle information is distributed automatically between the various vessels 20/30.

Using the exchange of information, for example, obstacle information can be displayed on local user interfaces of the outlying support vessels 30. These local user interfaces outline at least all of the active threats in the local area. Using the client modules 130, local operators on the support vessels 30 can create and remove obstacles O in the system 10 and modify their attributes. During monitoring activities, the support vessels 30 can also physically tag obstacles O with the disposable navigation beacons 40 used to track the obstacle's movement in real-time.

The planning tool 200 includes a drift model interface 210, a tow model interface 220, and data interfaces 230. The drift model interface 210 interfaces with a plurality of available drift models 212. Similarly, the tow model interface 222 interfaces with a plurality of available tow models 222. The data interfaces 230 receive data as input for processing and outputs data for display, analysis, and comparison. Accordingly, the input data includes, but is not limited to, weather data, tow vessel data, obstacle data, target vessel data, etc. The output data can include any suitable form of data for viewing, analysis, comparison, and the like according to the purposes disclosed herein.

An optimizer function 240 of the planning tool 200 enables system users to compare the various drift and tow models 212 and 222 with one another. This allows the system users to monitor each model 212, 222 to compare and score prediction performance against actual observed data. For example, the planning tool 200 can present comparisons in a "league table" or other display interface for the system user to study and select the best performing model 212, 222 to use. Other relevant decision-making data can be included in the table including seasonal and tidal patterns.

Figure 6A:
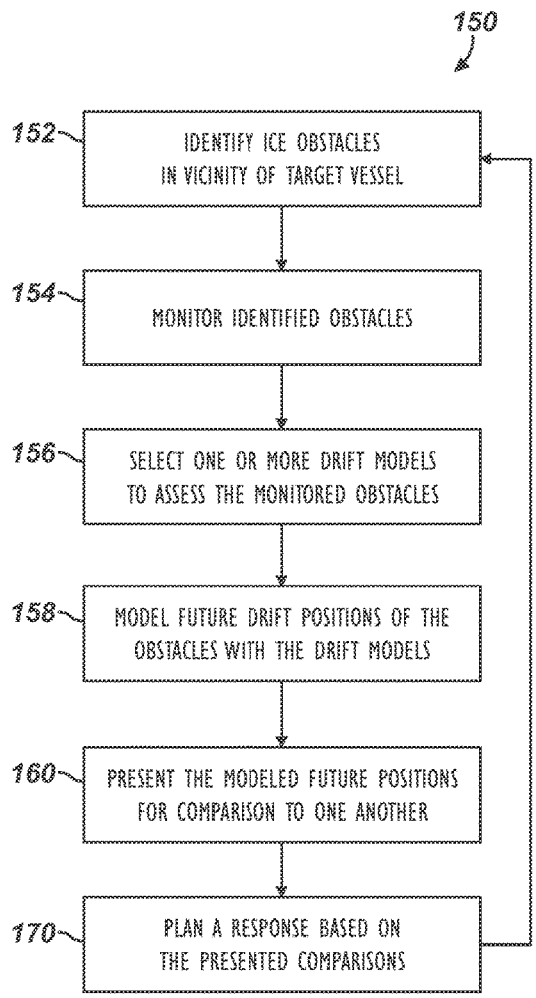
FIGS. 6A-6B show a process in flow chart form for the modelling system to model drift of an obstacle relative to a target marine structure.

While discussing particular examples of the system's operation with reference to FIG. 5, discussion also looks at a modelling process 150 shown in FIG. 6A. Although a general methodology has already been discussed, the process 150 in FIG. 6A for monitoring ice drift relative to the target marine structure or vessel 20 is laid out in some additional detail.

In the monitoring process (150), system operators access data interfaces 230 of the planning tool 200 of the disclosed system 10, which enables the system operators to monitor obstacles O. Initially, the system operators identify the marine obstacles O in the vicinity of the target vessel 20 (Block 152). As noted before, this can use manual observation, satellite imaging, ice imaging, and the like. Details about the obstacle's position, size, shape, direction, etc. are imported into the system's planning tool 200, and the system operators can use the planning tool 200 to create and edit details about the obstacles O. Some, if not all, of these functions can be automated using software programs.

Over time, the planning tool 200 monitors the position of these identified obstacles O relative to the target vessel 20 (Block 154). This monitoring produces historical tracks T of the obstacles O, which can be viewed by the system operators and analyzed by the system 10. The planning tool 200 then operates to integrate data from multiple drift models 212 by interfacing with multiple models 212, running the drift models 212, and displaying the results.

For example, one or more drift models 212 are selected to assess the monitored ice obstacles O (Block 156). This selection can be automated, user-defined, or based on manual user selection based on preferences. To operate with multiple models 212, the drift model interfaces 210 of the system 10 use a software framework capable of integrating with a number of available drift models 212. Therefore, any external software models 212 used by the planning tool 200 preferably have compatible and standardized data formats and interfaces for interacting with the planning tool 200.

The drift models 212 for icebergs and other ice obstacles are mathematical computer algorithms that are developed to predict the future movement (drift) of a given iceberg(s) or other ice obstacle. Inputs to such models 212 include position, time, size, shape, and environmental observations, such as ocean current, wind, temperatures, and environmental constants or physical statics. In addition, the drift models 212 can include spatial current models at a variety of water depths and spatial wind forecasts or predictions. The data for water currents, wind currents, and other forecasts can be obtained from external data providers, such as discussed above.

The modeling of future positions by the drift models 212 may be manually output as desired by a user or may be automatic or user-defined. For example, as new data becomes available (new iceberg observations or environmental Metocean data is obtained), the planning tool 200 can then automatically run each drift model 212, although this can be user managed.

At a minimum, the drift models 212 extrapolate future position(s) or track(s) of the ice obstacles O based on observed iceberg data. In more sophisticated modeling, the drift models 212 take into account a number of the other variables and mathematical relationships outlined above. The drift models 212 can also predict melt conditions and calving (splitting) events that may occur during movement of the iceberg(s) O.

As the system 10 operates, the planning tool 200 models future drift positions of the obstacles O with the drift models 212 (Block 158). An input to the models 212 in the planning tool 200 can include the time in the future in which an operator wishes to predict the obstacles' drift with respect to the target vessel 20. The outputs from each of the models 212 include the obstacle's future drift positions for the given future prediction time. Ultimately, the planning tool 200 can thereby predict future position(s) and track(s) T for the obstacles O based on the drift models 212, historical movements, ocean currents, size and position of obstacles, etc. These future drift position(s) and track(s) T then define what threats may exist to the target vessel 20 and what possible time frames those threats may take to become imminent.

Once the modeled future positions are determined, the planning tool 200 then presents the modeled future positions for comparison to one another (Block 160). As detailed below, presenting the modeled future positions can use data interfaces 230 of the planning tool 200 to display results for comparisons. From the presented results, the system operators can use the planning tool 200 to plan a response (e.g., various tasks) to respond to the predicted threats (Block 170).

To do this, the system operators can configure a number of tasks or assignments to be performed by support vessels 30 and other components. These various tasks can be arranged in various scenarios in which particular resources (e.g., support vessels 30, beacons 40, remote vehicles 50, etc.) are deployed in different ways to deal with predicted threats. Each scenario is essentially a model of predictions showing possible movements and changes of threats in the environment and possible strategies and tasks for dealing with the threats. Thus, the scenarios allow the system operators to create and analyze multiple "what if" situations using the observed data available in the system 10. Each scenario can have differing prediction models applied and can allow the system operators to visualize possible outcomes and threats.

For each scenario, the disclosed system 10 as shown for example in FIG. 5 uses the selected marine obstacle prediction models to predict the track T for each obstacle O (based, for example, on drift and tow models 212, 222) and constantly checks for the possibility of future collisions. The target vessel 20 can also be assigned multiple safety boundaries Z, such as the boundaries $Z_1$, $Z_2$, and $Z_3$ in FIG. 5. If any of the marine obstacles O encroaches on the vessel's safety boundaries Z, the system 10 raises an alarm, which can be displayed and logged. This information allows the system operators to decide on the optimal course of action to protect the target vessel 20.

Additional examples of the system's operation with reference to the example arrangement of components shown in FIG. 5 are disclosed in the incorporated U.S. application Ser. No. 14/077,467 and are not repeated here for brevity.

Figure 6B:
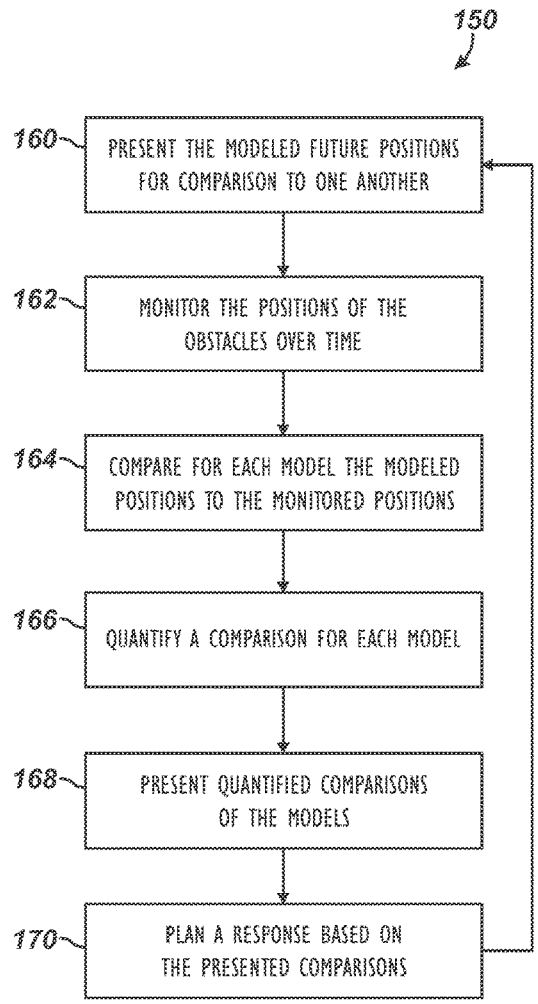

On a further level, the planning tool 200 tracks the models 212 and their modeled future or subsequent positions over time, compares the accuracy of the results, ranks the models 212, and enables operators to choose preferred models 212. In particular, FIG. 6B shows additional steps in the process 150 for accessing the models to plan a response to ice obstacles. In presenting the modelled future positions for comparison to one another (Block 160), the planning tool 200 monitors the positions of the obstacles O over time (Block 162). For each model 212, the planning tool 200 compares the modified positions to the monitored positions for the ice obstacles O (Block 164). This shows the accuracy of the models 212 based on what they previously predicted and what the ice obstacle O is actually observed as doing.

A comparison for each model 212 is quantified (Block 166), and the quantified comparisons of the models 212 are presented for assessment (Block 168) so a response can be better planned based on the presented comparisons (Block 170). For example, the accuracy for each of the models 212 can be displayed as a percentage of accuracy or other statistic of the models 212 relative to the actual tracked position of the obstacles O. The accuracy of each model 212 can be displayed relative to one or more of the other models 212 for comparative purposes. These and other comparative quantities could be used to assist the system operator or any automated feature of the planning tool 200 in planning a response.

As noted previously, the modelling system 10 uses a number of data interfaces 230 for displaying information on the vessels 20/30. In general, these data interfaces 230 can show satellite ice data, ice obstacles, radar targets, beacons, vessels, and other elements of the modelling system 10.

Attributes of the various elements can also be viewed, and multiple displays can be configured.

Some examples of a user interface screen 300 for the disclosed system 10 are described below with reference to FIGS. 7A-7C. As will be appreciated with the benefit of the present disclosure, system operators can use these various user interface screens 300 as well as others not detailed herein to visualize the surrounding environment, operational parameters, drift and tow model calculations, and other useful information. The user interface screen 300 can be part of the planning tool (200; FIGS. 3B & 5) operating on the system's architecture 100 on the vessels 20/30 or other location so operators can review information, configure the system 10, track and monitor threats, and plan tasks and other activities in response.

Figure 7A:
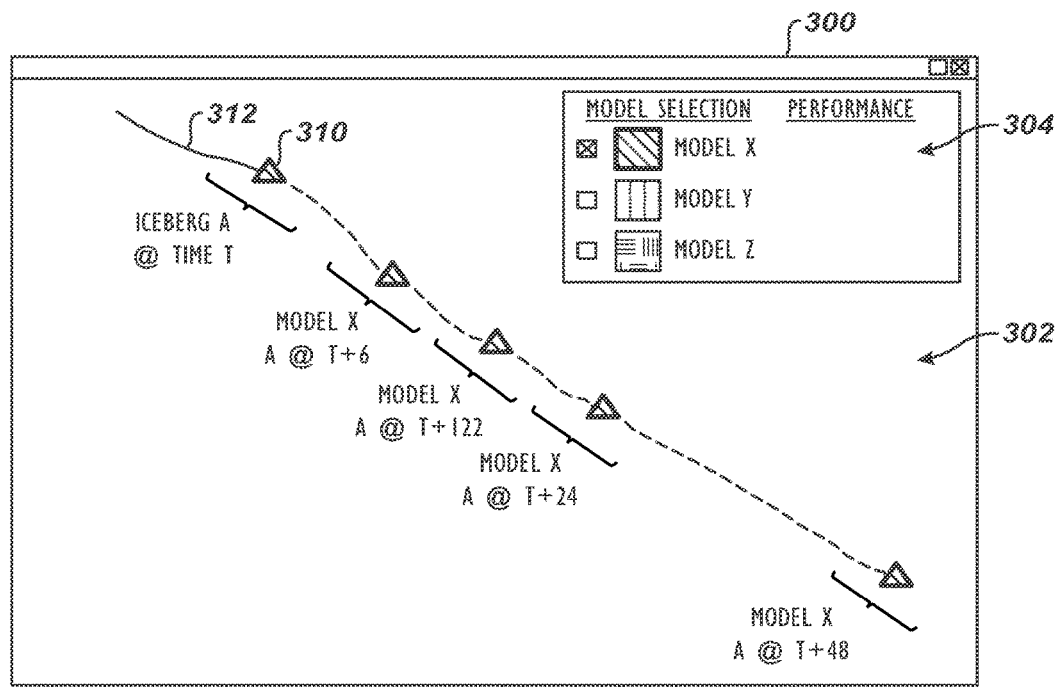
FIGS. 7A-7C show example user interface screens for the disclosed modelling system displaying drift models for an obstacle.
Figure 7B:
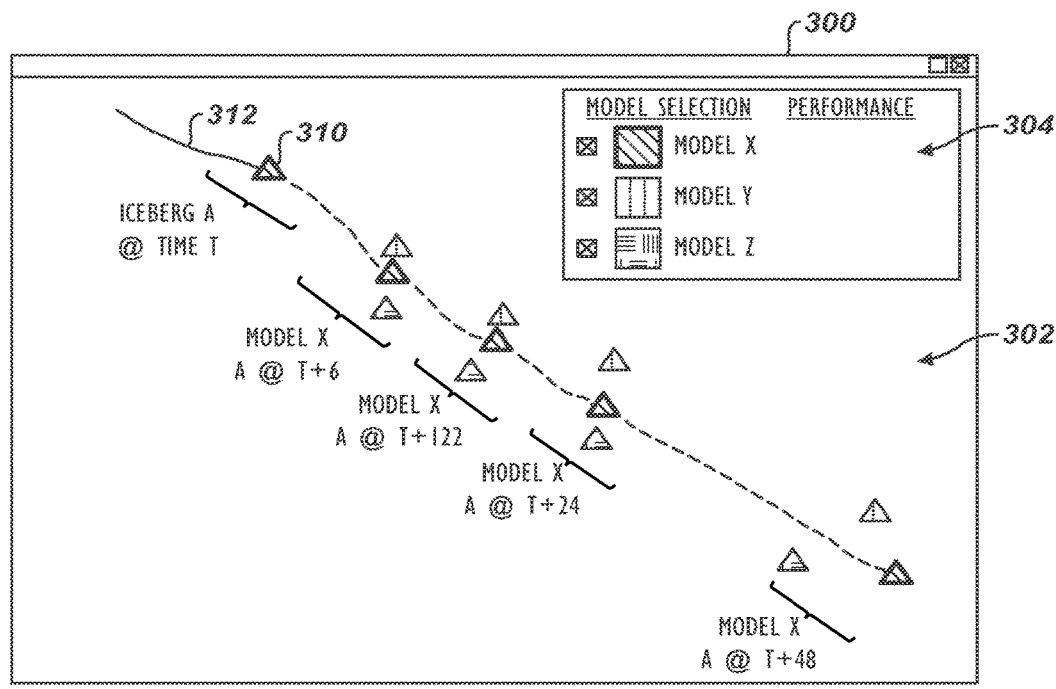
Figure 7C:
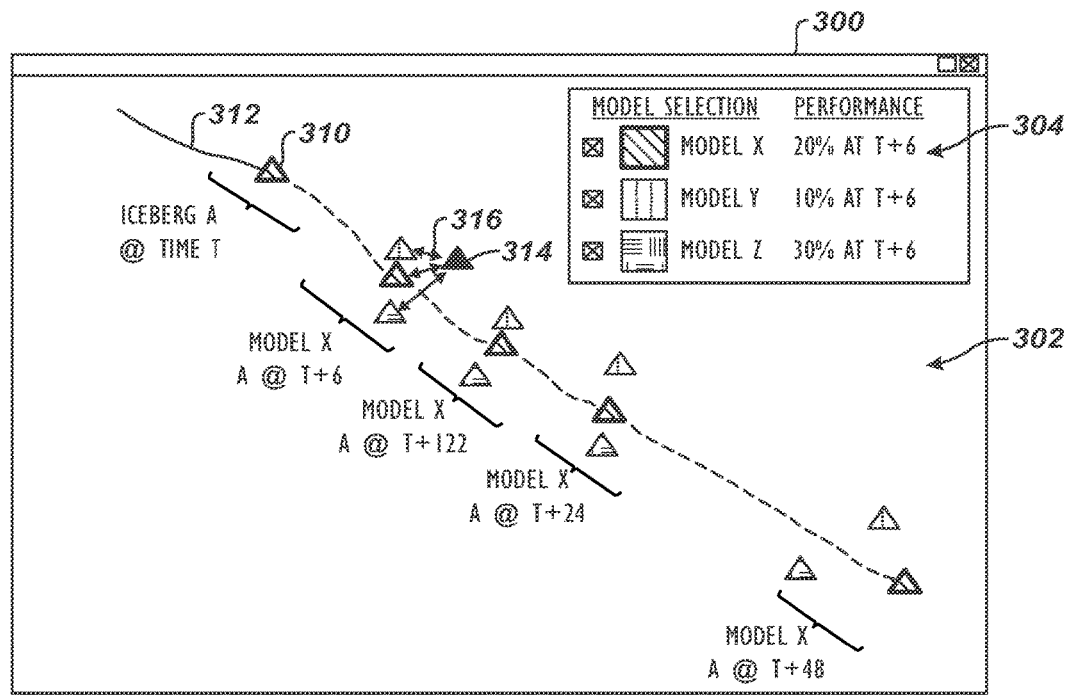

In FIG. 7A, the screen 300 displays a section of a map 302 in the area of interest in which an identified ice obstacle 310 (e.g., iceberg) is depicted. The historical track 312 of the obstacle 310 is shown leading up to the current or given position of the obstacle 310 at time T. A model selection panel 304 can be used to select which drift model (model X) to apply to the obstacle 310 and the current environmental conditions. Here, only one model has been selected for display.

The current position of the obstacle 310 is displayed at time T at the end of the historical track 312, which may have been monitored overtime with historical information. From there, subsequent drift positions of the obstacle 310 that have been modeled are shown for the one model (i.e., model X) at calculated time intervals (T+6, T+12, etc.).

The modelling system inputs the latest data and obstacle positions to the selected model(s) in turn and obtains predicted positions for a number of time periods into the future from the models' analyses. For example, given the latest environment conditions and the position of the obstacle 310 at time T, the modelling system predicts with each model where the obstacle 310 will be positioned at time T+6 hours, T+12, T+24 and T+48. The modelling system can then record all of the predicted positions from each model for display, monitoring, and further evaluation. For example, FIG. 7B shows the user interface 300 showing predicted positions for the obstacle 310 from several models X, Y and Z for the future times T+6 h, T+12 h, T+24 h, T+48 h.

As time progresses, the predicted positions from each model 212 are scored against the actual observed position of the obstacle 310, which is obtained through tracking, observation, satellite data, reconnaissance, etc. In the previous example, at time T+6 hours, the 6 hour prediction made at time T will be compared with the observed position at time T+6. As shown in the screen 300 of FIG. 7C, for example, the actual position 314 for the obstacle 310 at time T+6 is displayed versus predicted positions at that time T+6 for the models. The position difference 316 between the actual position 314 and the predicted positions can be recorded and used as a measure of each models' performance at predicting 6 hours into the future. As more time passes, the position differences 316 for each time interval can also be recorded and also used as a measure of the models' performance.

After a period of time, the planning tool 200 generates a history of how each model 304 has performed in predicting the obstacle's positions over a number of time periods. The performance statistics can be used to form a league table 306 of the models 304 from which the user can identify the best performing model 304 for the time periods configured. In this way, the planning tool 200 can enable the system user to evaluate the performance of models 304 and further select preferred models 304 under the circumstances. In fact, the user can use the performance results of the drift models 304 to choose the drift model 304 to feed predicted positions into other modules of the planning tool 200, such as assessing tow models as discussed below.

When the drift model(s) indicate that an ice obstacle poses a threat to the target marine structure, the ice management supervisor has two choices: either move the target structure to avoid the threat or move the iceberg to avoid the target structure. On a regular traveling vessel, such as a standard ship, operators could simply navigate the ship to avoid the ice threat. This is not typically possible or even practical with a target marine structure as disclosed herein conducting a set operation in the icy environment. As discussed herein, the target marine structure conducting its set operation cannot be readily moved and is not expected to or desired to be moved unless absolutely necessary. In fact, the target structure performing the set operation may be a seismic vessel towing several kilometers of streamer behind it, or may even be a stationary vessel, such as an oil rig, drill ship, FPSO, etc. To move these vessels is an expensive and time consuming operation. For this reason, the preferred option here is to move the iceberg or obstacle itself, and as expected, this is a challenging and dangerous activity.

Therefore, to plan a response, analysis based on the presented comparisons of the modelling system 10 also takes into account tow models in which the obstacles are moved or altered during their drift relative to the target marine structure. In this way, in addition to using drift models 212 to monitor ice obstacles, the planning tool 200 can further use tow models 222 to monitor ice obstacles and plan a response, such as towing the ice obstacles.

Dealing with a threatening iceberg or other ice obstacle by towing involves moving the iceberg out of the danger area and disposing of it where the ocean currents will not bring it back. As will be appreciated, towing the ice obstacle can involve pulling (towing), pushing, steering, and the like, and methods are known how to connect to and engage the iceberg, and they are not detailed here for brevity. In general, to tow an iceberg, a support vessel can wrap a dedicated iceberg tow line around the iceberg and can tow the iceberg to a safe area.

A number of factors are taken into account when planning an iceberg tow, including consideration of the size and shape of the iceberg, mass, draft, proximity to facilities, ocean currents, wind conditions, support vessel availability, the horsepower required by the tow vessel to tow the iceberg, an appropriate place to drop the iceberg, the distance to tow, and the time that will be required to tow the iceberg. Additionally, a number of features are required on the tow vessel to be able to effectively tow an iceberg, and these likewise are not detailed here. In any event, due to the complexity of the operation, making the correct towing decision can be a challenge especially when operators have multiple icebergs threatening a target marine structure in an area, when operators have multiple drop zone options, and when the operations have limited availability of tow vessels.

Because the obstacles may be towed during the course of planning and monitoring with the system 10 as noted above, the planning tool 200 interfaces with multiple tow models 222, runs the tow models 222, and displays results so operators can plan tow operations accordingly.

Figure 8:
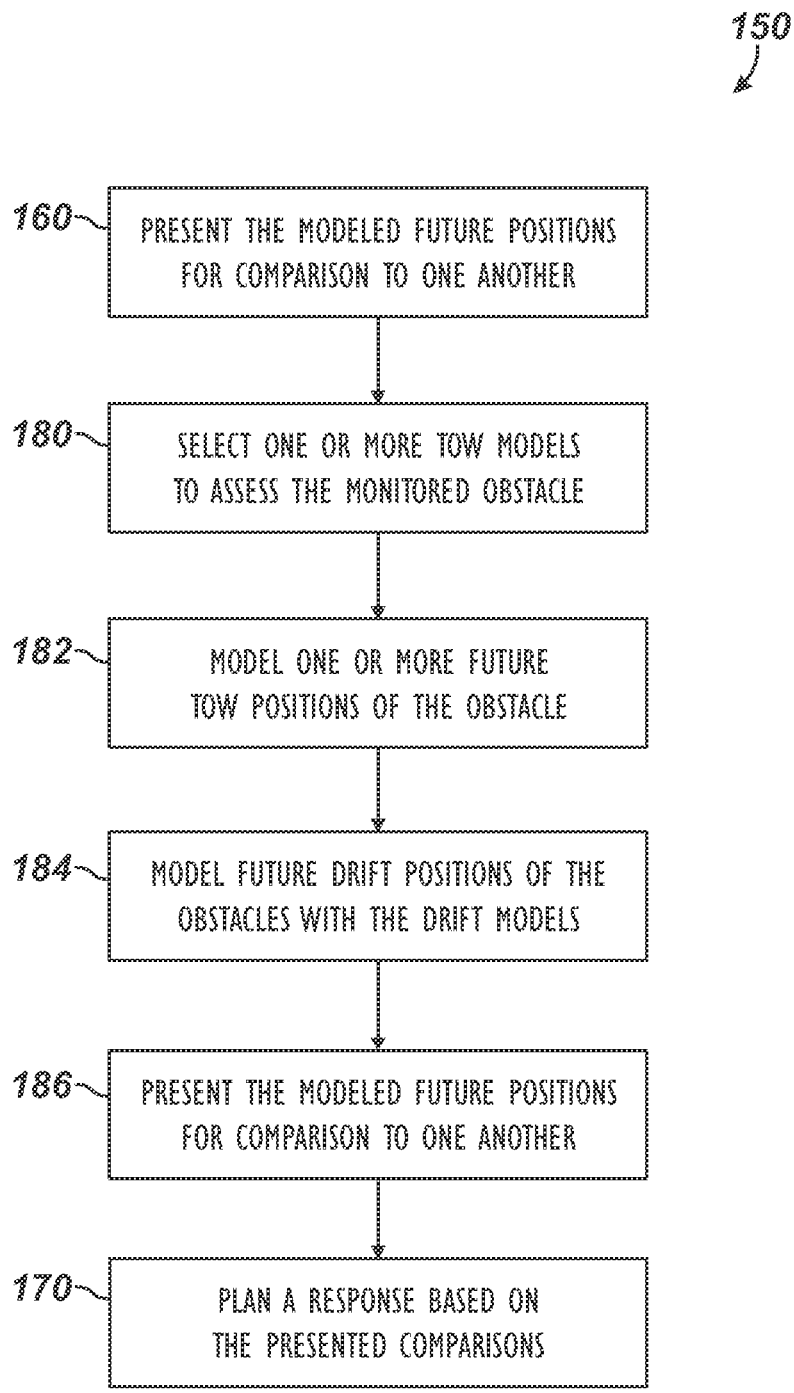
FIG. 8 show a process in flow chart form for the modelling system to model tow of an obstacle relative to a target marine structure.

For example, FIG. 8 shows additional steps in the process (150) for assessing the drift and tow models 212, 222 to plan a response to ice obstacles O. In presenting modelled positions of the ice obstacle (Block 160), the planning tool 200 use one or more tow models 222 to assess the monitored obstacles O (Block 180) and models one or more future or subsequent tow positions of the obstacle O (Block 182). In running the tow models 222, the planning tool 200 can automatically calculate the suggested vessel's sail track T required to carry out a task starting from the current vessel position or from the end of a previous task. The disclosed modelling system 10 also calculates the estimated time to travel between tasks.

Making the correct tow decision at the right time is a difficult task. At a given tow position, the towed ice obstacle O may be released, but the obstacle O would then drift relative to the target structure 20 and may still pose a threat. Then of course, once the ice obstacle O is dropped or released, knowing where the obstacle O will drift is again equally important. Therefore, the planning tool 200 also models future or subsequent drift positions of the obstacles O with the drift models 212 based on the future tow positions (Block 184). The modeled future tow and drift positions are then presented for comparison to one another (Block 186). Using all of these modelled drift and tow positions, the system user can use the planning tool 200 to plan a response based on the presented comparisons (Block 170). Thus, at an additional level similar to what is disclosed above with reference to FIG. 6B, the planning tool 200 tracks results of these tow models 222 over time, compares the accuracy of the results, ranks the tow models 222, and enables operators to choose the preferred tow model(s) 222 for the situation.

Figure 9A:
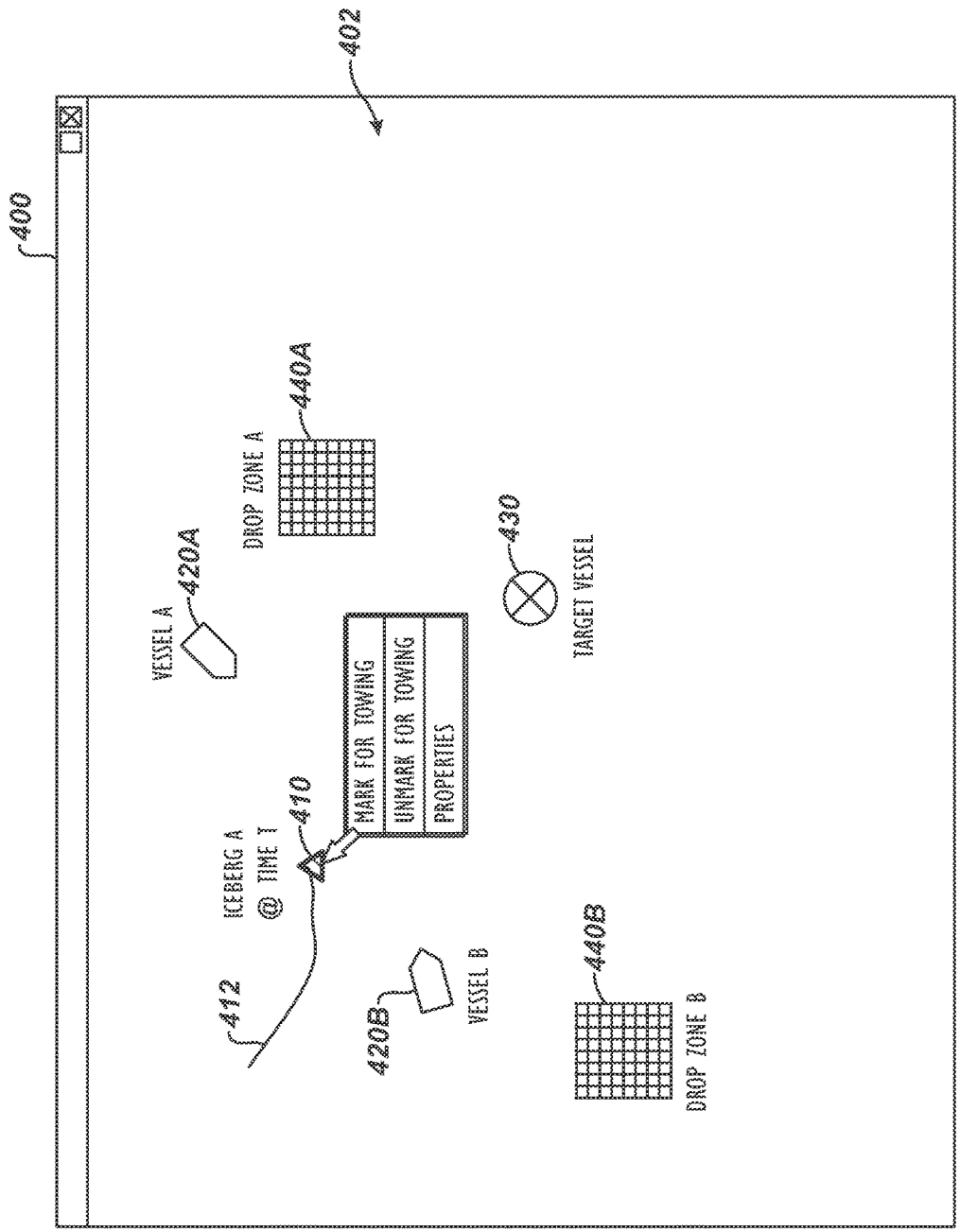
FIGS. 9A-9C show example user interface screens for the disclosed modelling system displaying tow models for an obstacle.

FIG. 9A illustrates a user interface screen 400 of the planning tool (200) having an obstacle 410 (e.g., iceberg at a given time T) at the end of its historical track 412. As before, the obstacle 410 is shown on a section of a map 402 in the area of interest. Resource vessels 420A-B are shown relative to the obstacle 410 and the target vessel 430. Two predicted drop zones 440A-B are shown for possible release of the obstacle 410 when towed by one or both of the vessels 440A-B. In general, the drop zone 440 can be considered as a defined area where an ice obstacle 410 (i.e., iceberg) under tow can be dropped so that sea currents and wind will push it out of harms way of the target structure 430.

Once an ice obstacle 410 has been identified as a threat, the system user can mark the obstacle 410 for towing with the planning tool 200 in the user interface screen 400. Once marked, the system user can then drag the obstacle 410 on the map 402 and drop it on a specific drop zone 440A-B. Alternatively, all drop zones 440 can be considered for analysis. As for the drop zones 440, the user can create new drop zone 440, move existing drop zones 440, etc. for assessment. Additionally, the modelling system may calculate prospective drop zones based on the analysis discussed below.

Once the drop zone(s) is selected or the obstacle 410 is marked for towing, the planning tool 200 inputs the obstacle's properties (position, size, mass, draft, set and drift) and environment details (wind, current, and other environmental factors) and known or prospective drop zone details into the one or more tow models. The tow models then process the input data and return tow details for the selected drop zone(s).

Figure 9B:
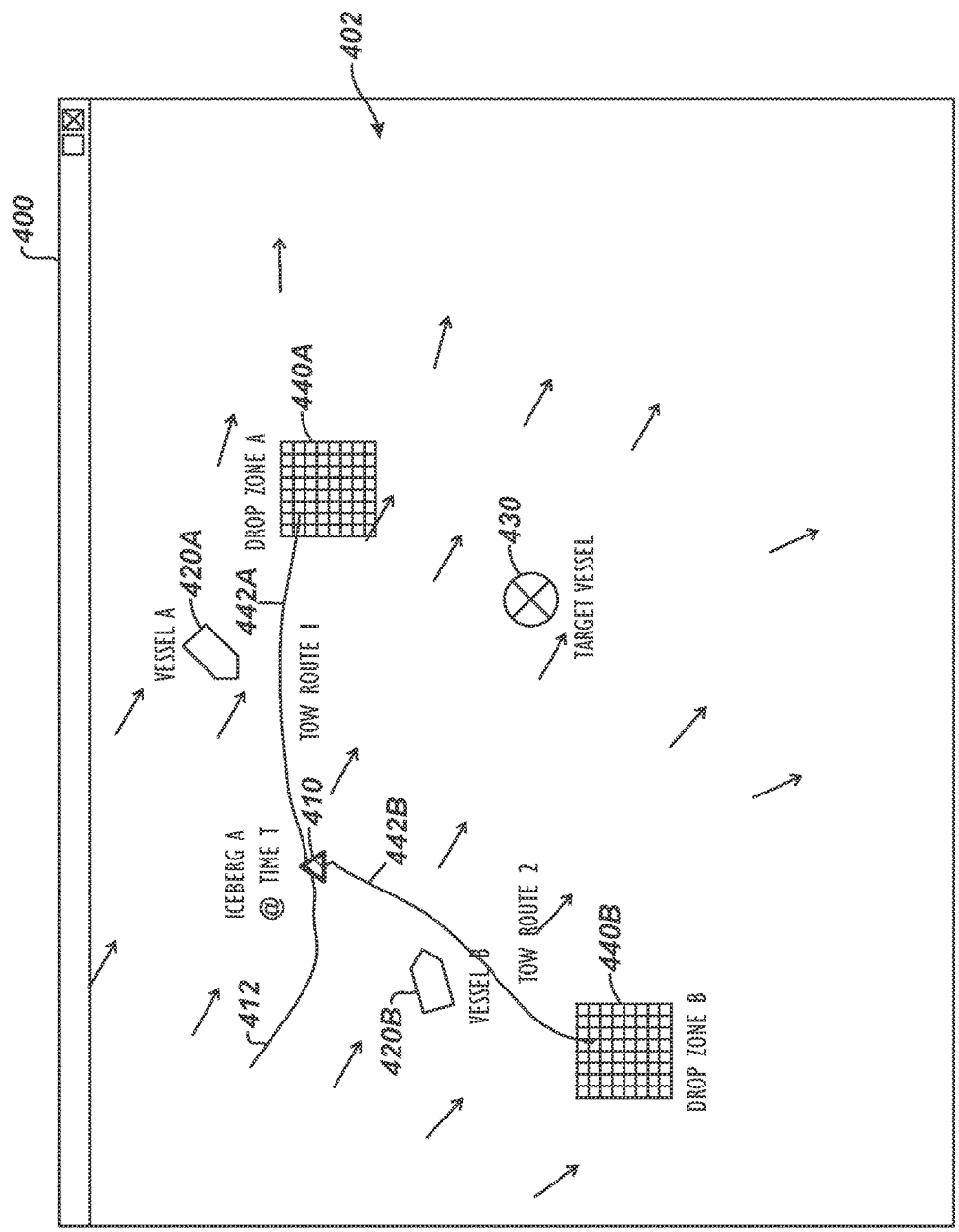
Figure 9C:
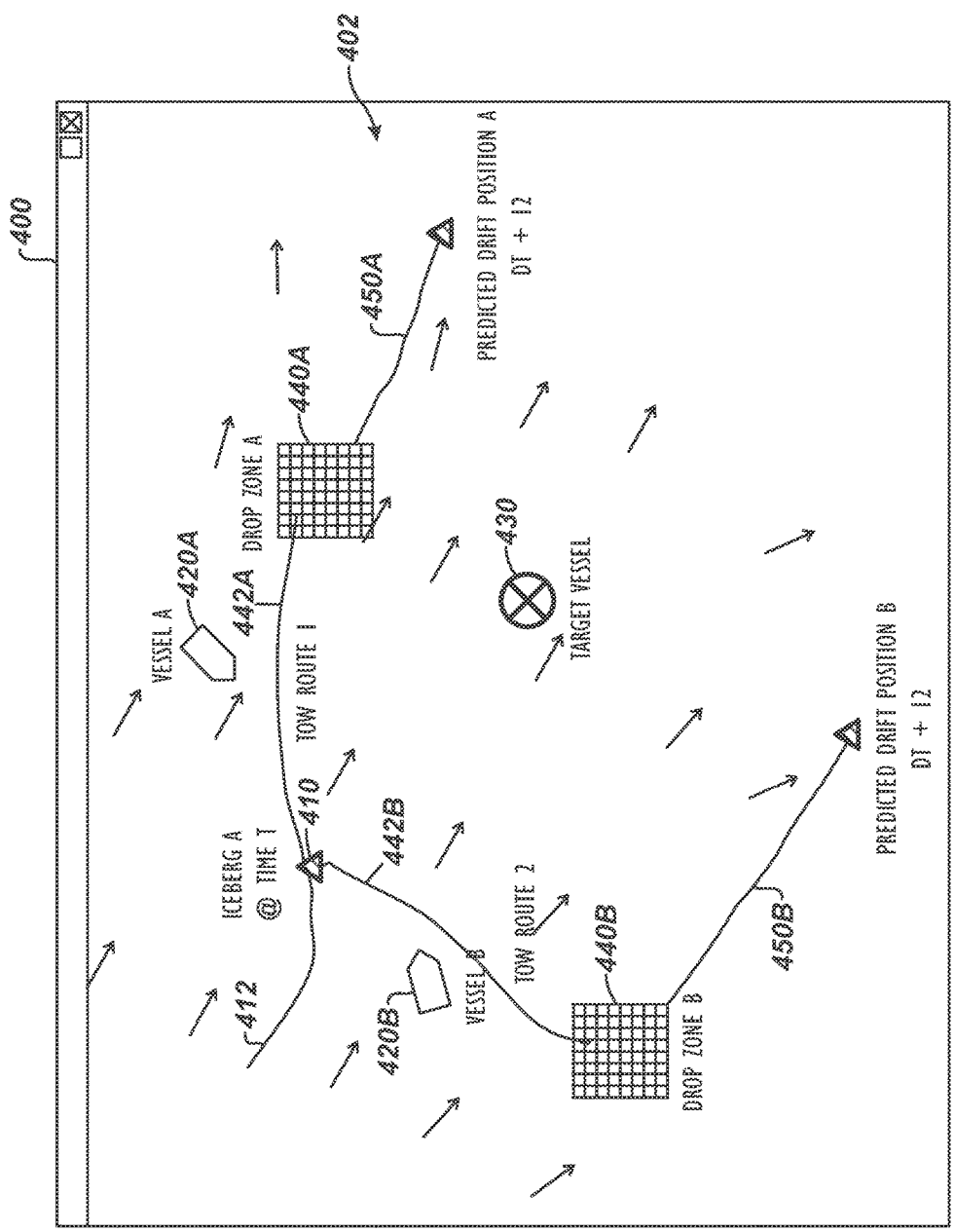

In FIG. 9B, for example, prospective tow routes 442, 444 are depicted for towing the ice obstacle 410 to two example drop zones 440A-B. Various environmental conditions (wind and current) data may also be depicted as it has been used in the tow models. As further depicted in FIG. 9C, drift model analysis can then be performed on the position of the obstacle 410 towed in the prospective tow routes 442, 444 to the drop zones 440A-B. By running the tow models and the drift models as disclosed herein, details of the tow routes and predicted drift positions 450A-B of the dropped ice obstacle 410 can be calculated and displayed, as shown in FIG. 9C.

Figure 10A:
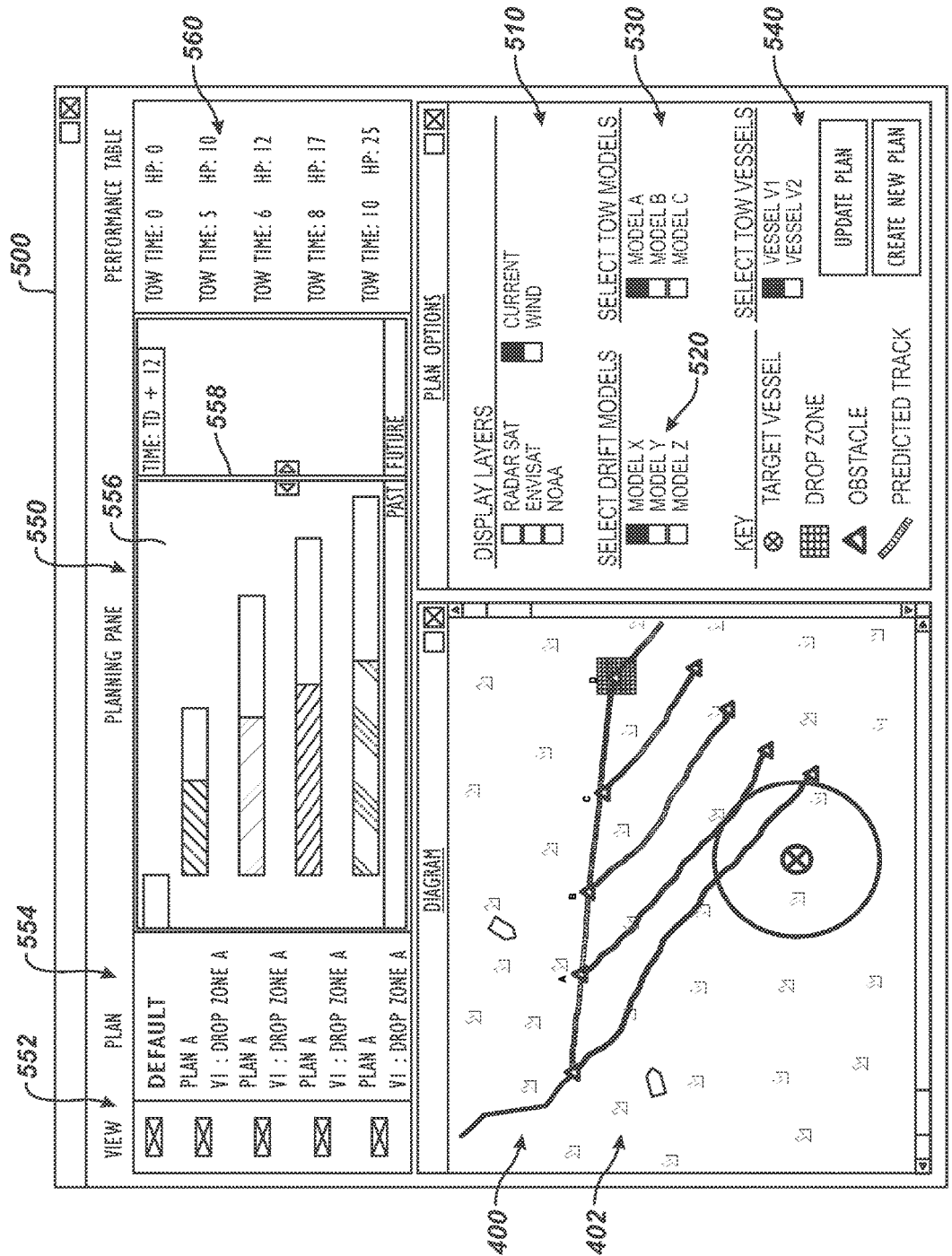
FIGS. 10A-10B show additional user interface screens for the disclosed modelling system displaying tow and drift models for an obstacle.

FIG. 10A shows an additional user interface screen 500 of the planning tool 200 for assessing and planning tow and drift models. The screen 500 includes a map display 400, display options 510, tow model selection 520, drift model selection 530, tow vessel selection 540, a planning pane 550, and a league table 560.

The map display screen 400 is similar to that discussed above and is shown in greater detail in FIG. 10B. Within the planning tool (200), the position of each vessel 420, 430 is also known, and the fleet of tow capable vessels 420 is known and defined for access in planning. As part of the definition, the vessel's towing power can be specified. Scheduled tasks for each vessel 420, 430 can also be defined and shown in the planning pane 550, giving the user a temporal view into each vessel's availability. The display options 510 allow the user to display various environmental conditions (e.g., wind, current, etc.) as layers in the map screen 400.

As noted above, the planning tool (200) is configured to integrate with any of a plurality of tow and drift models for analysis. In particular, the tow model selection 520 and drift model selection 530 allow the user to select respectively which tow and drift models to use for calculation and display in the map screen 400. Instead of showing all of the tow and/or drift models, the user can therefore select in the selections 520 and 550 which one or more of the model predictions to use for display together on the map 400. The vessel selection 540 allows the user to select one or more of the available vessels 420A-B for towing the selected obstacle 410 in the planning.

The planning pane 550 allows the user to define and select various plans for towing the obstacle 410. Using viewing and planning options 552, 554, plans can be added and viewed and can be configured for the available tow vessel selections 540, tow model selections 520, drift model selections 530, drop zones 440, and other configurable factors.

The planning pane 550 also includes a calendar or timeline 556 of the plans. As shown in the planning pane 550, the user can use one or more "time-sliders" 558 to advance or back the timeframe of what is displayed. The time-sliders 558 allow the user to see (and compare) model predictions backward and forward in time. Positions for intermediate times can be interpolated and shown on the map 400 based on available data points from incremental calculations. Finally, the league table 560 provides comparative details for the plans for assessment purposes.

Once the system user has identified a threatening ice obstacle 410, one course of action may be to tow the obstacle 410 out of the danger area to a safe drop zone 440. Before the towing action can commence, the system user can analyze the situation with the planning tool (200) and user interface screen 500 to assess a number of questions. For example, the system user may want to determine which vessel 420 to use for towing, where the best drop zone 440 for the obstacle 410 may be, when is the best time to tow the obstacle 410, how much horsepower and time may be required to tow the obstacle 410 to the selected drop zone(s) 440, are there any vessels 420 available with the necessary horsepower, etc. The planning tool 200 has functionality to help the system user answer these questions by providing modelling, calculation, and display to facilitate the decision making process.

As the user interface screen 500 shows, the planning tool (200) integrates the tow vessel's availability details into tow model results, allowing the user to filter the vessels 420A-B based on availability, distance from the obstacle 410, and towing strength. The planning tool (200) allows the user to dynamically specify a drop zone 440 on the map 400 for tow and drift model analysis. Alternatively, a number of drop zones 440A-B may be defined within the planning tool (200) and stored within the configuration. Drop zones 440A-B can be clearly shown as a data layer within the planning tool's display map 400.

When the drop zone 440 and tow vessel 420 are selected, the user selects one or more tow models (selection 520) to be used to forecast the towing of the obstacle 410 with the selected tow vessel 420. The tow model determines in part how long the tow route will take, what is the best drop zone location, when the tow vessel would be released for towing some other potential obstacle, and other factors.

Figure 10B:
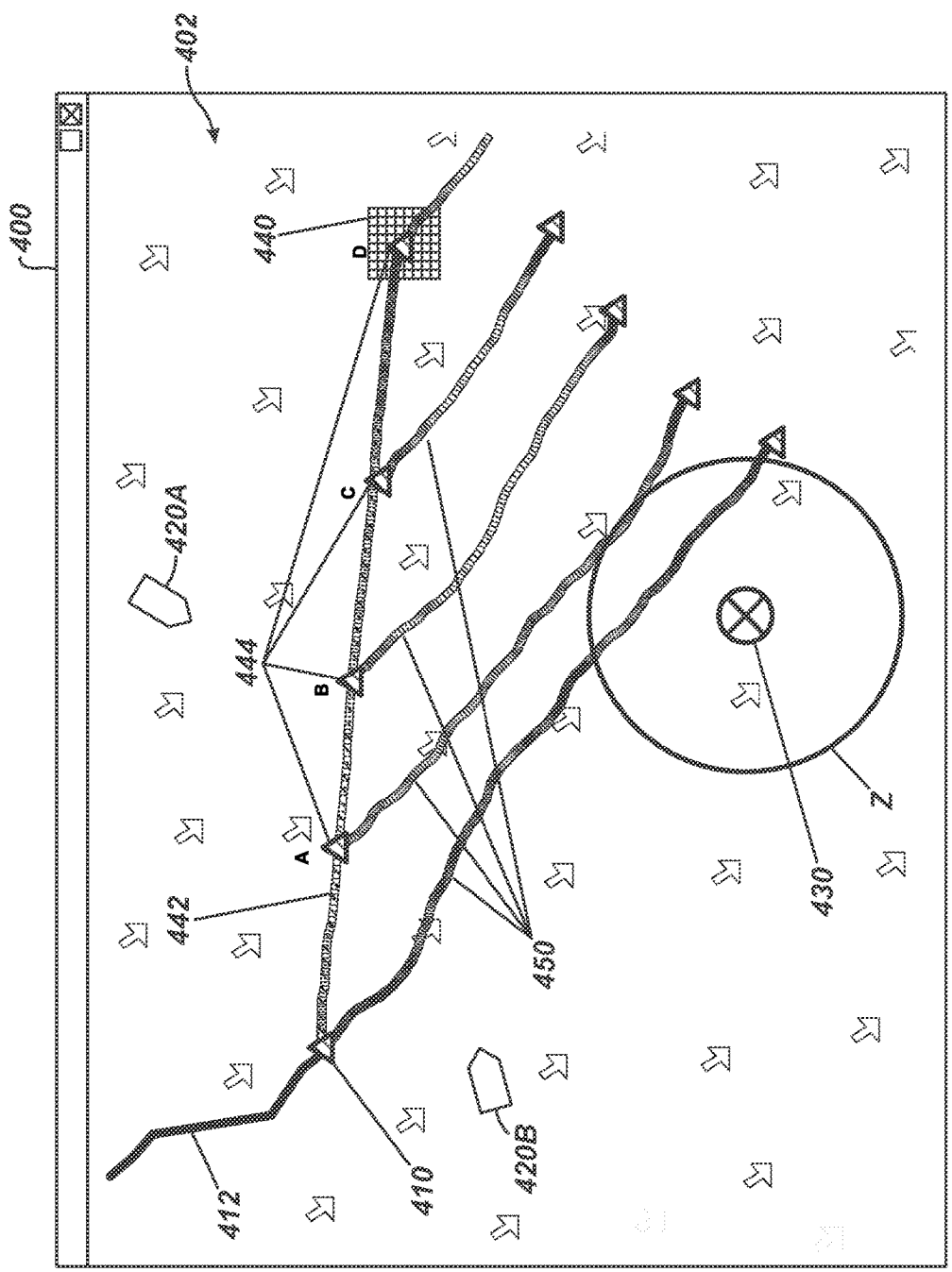

The tow models then process the input data and return tow details for the selected drop zone(s), intermittent positions, or intervals of time. As shown in FIG. 10B, for example, a tow track 442 for towing the obstacle 410 from its current position toward a potential drop zone 440 has been calculated with one of the selected tow models and is shown on the map screen 400. Intermediate drop zones or tow positions 444 may also be calculated and displayed. (Only one tow model is depicted being applied in FIG. 10B for simplicity of illustration. As noted herein, multiple tow models can be applied and selectively shown for comparative purposes according to the present disclosure.)

From the calculations, the tow models return tow details that can include tow-time and tow horsepower required to tow the obstacle to each drop zone. These details can be provided in the league table 560 of FIG. 10A. Other input and output details for the analysis can be geared to other decision goals, such as efficiency, heightened safety margins, etc.

When the drop zone 440 and tow vessel 420 are selected, the user also selects one or more drift models (selection 530) to be used to forecast the movement of the obstacle 410 after it is dropped in the drop zones 440 or other locations, ensuring that the obstacle 410 will move away to a safe area. The drift models then process the input data and return drift details for the selected drop zone(s), which may or may not be selected for display on the map 400. As shown in FIG. 10B, for example, the drift tracks 450 for the obstacle 410 from its current position and the intermediate tow positions have been calculated with one of the selected drift models and are shown on the map screen 400. (Only one drift model is depicted being applied in FIG. 10B for simplicity of illustration. As noted herein, multiple drift models can be applied and selectively shown for comparative purposes according to the present disclosure.)

Because the goal of drop zones 440 or other locations is to move an obstacle out of the way, the drop zone can be defined by boundaries, as schematically depicted in FIGS. 9A-9C and 10A-10B. Additionally, the target marine structure 430 may be defined by one or more operational or safety zones Z, such as shown in FIG. 10B.

Figure 11:
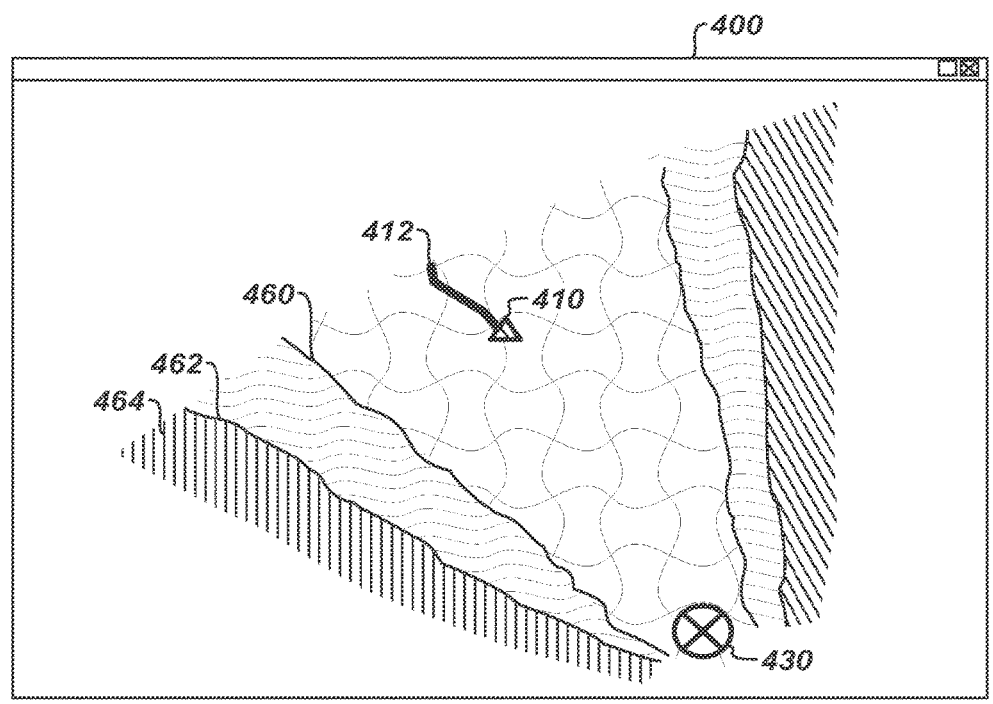
FIG. 11 shows an alternative user interface screen depicting drop zone information for an obstacle relative to a target marine structure.

An alternative depiction for the screen 400 is shown in FIG. 11. Here, the boundaries 460, 462, 464 are expansive and open relative to the target marine structure 430. The boundaries 460, 462, 464 are calculated based on tow and drift models taking the current environmental conditions into consideration with respect to the relative positions of the obstacle 410 and target marine structure 430. In this way, once the obstacle 410 is moved beyond one or more of the boundaries 460, 462, 464, the tow and drift analysis can indicate that the moved obstacle should no longer threaten the target vessel 430. Accordingly, the boundaries 460, 462, 464 define "safe zones" beyond the target vessel 430 and define a series of "inbound risk zones" stretching miles upstream of the target vessel 430.

The techniques of the present disclosure can be implemented in digital electronic circuitry, or in computer hardware, firmware, software, or in combinations of these. Apparatus for practicing the disclosed techniques can be implemented in a computer program product tangibly embodied in a machine-readable storage device for execution by a programmable processor; and method steps of the disclosed techniques can be performed by a "computer system" or "processing equipment," which can include one or more programmable processors executing a program of instructions to perform functions of the disclosed techniques by operating on input data and generating output. A suitable processor for the "computer system" can include, by way of example, both general and special purpose microprocessors. Generally, the processor receives instructions and data from a read-only memory and/or a random access memory, including magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

As discussed previously, the disclosed system and methods can be used in icy regions having glacial ice, pack ice, ice floes, and other ice obstacles. However, the disclosed system and methods can be used in other locations having debris, plants, flotsam, jetsam, marine animals, or other obstructions or obstacles submerged and/or floating in the water that can interfere with drilling, production, or exploration operations. Therefore, the teachings of the present disclosure are not limited to use in only icy regions.

Although only some user interface screens for the modelling system 10 have been shown, it will be appreciated that the user interfaces and various modules of the modelling system 10 can use a number of screens for entering, modifying, and displaying information. For example, a user interface screen may be provided that allows operators to relay and communicate instructions between vessels, maintain action items, modify or configure the modelling system, and the like.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A marine threat modelling method for a target marine structure conducting a set operation in a body of water, the method comprising:
monitoring with a computer system a given position of an obstacle drifting relative to the target marine structure;
modeling with the computer system at least two different tow routes actively diverting the same obstacle over time from the given position to at least two different tow positions relative to the target marine structure by using at least two different tow models for calculating an active diversion of the same obstacle in each of the at least two different tow routes;
modelling with the computer system one or more altered drift tracks of the obstacle for each of the active diversions by using one or more drift models for calculating a passive drift of the obstacle over time form the at least two different tow positions of each of the active diversions;
presenting with the computer system the at least two different tow routes and the one or more altered drift tracks for each of the active diversions for comparison to one another; and
initiating with the computer system based on the comparison a tow operation to actively divert the obstacle.

2. The method of claim 1, wherein the obstacle includes an iceberg, ice floe, pack ice, debris, plants, flotsam, jetsam, floating obstacles, submerged obstacles, marine animals, fish schools, whale pods, or a combination thereof; and wherein the target marine structure is selected from the group consisting of a drilling structure, a drilling ship, a production structure, a production vessel, a production platform, a wellhead, a riser, an exploration structure, a seismic survey vessel.

3. The method of claim 1, wherein monitoring with the computer system the given position of the obstacle comprises one or more of:
receiving the given position from at least one beacon deployed on the obstacle;
determining the given position from imaging data; and
obtaining manually-entered data of the given position.

4. The method of claim 1, wherein modeling with the computer system the at least two different tow routes comprises: obtaining input data from one or more sources; and producing output data representative of the at least two different tow routes by processing the obtained input data with an algorithm of each of the at least two different tow models.

5. The method of claim 1, wherein presenting with the computer system the at least two different tow routes and the one or more altered drift tracks for each of the active diversions for comparison to one another comprises displaying the at least two different tow routes and the one or more altered drift tracks for each of the active diversions for visual comparison.

6. The method of claim 1, wherein monitoring with the computer system the given position of the obstacle comprises monitoring a plurality of the given position of the obstacle over time.

7. The method of claim 1, further comprising:
quantifying accuracy of each of the at least two different tow models based on the comparison; and
presenting the quantified accuracy.

8. The method of claim 1, further comprising: quantifying accuracy of each of the one or more drift models based on the comparison; and presenting the quantified accuracy.

9. The method of claim 1, wherein monitoring the given position of the obstacle comprises determining the given position by initially modelling one or more given drift tracks of the obstacle by using one or more drift models for calculating a passive drift of the obstacle over time.

10. The method of claim 9, further comprising one or more of:
planning with the computer system a response to the one or more given drift tracks;
planning deployment of at least one resource in response to the one or more given drift tracks;
planning to divert the at least one obstacle by directing at least one vessel relative to the obstacle; and
planning to break the obstacle with the at least one vessel.

11. The method of claim 9, wherein the at least two different tow models are applied to the given position and/or to at least one of the one or more given drift positions of the at least one obstacle on the one or more drift tracks.

12. The method of claim 9, wherein modeling with the computer system the one or more given drift tracks of the obstacle over time relative to the target marine structure comprises predicting with the computer system at least one threat to the target marine structure from at least one of the one or more given drift tracks of the obstacle.

13. The method of claim 12, further comprising planning with the computer system the tow operation as a response to the at least one predicted threat.

14. The method of claim 12, wherein predicting with the computer system the at least one threat to the target marine structure from the obstacle comprises: determining an attribute of the obstacle of the threat; and comparing the determined attribute to a limitation of the target marine structure.

15. The method of claim 14, wherein the attribute is selected from the group consisting of a size, a distance, a speed, a shape, a depth, a track, a threat level, a time interval to move, and a time interval to break up.

16. The method of claim 14, wherein the limitation of the target marine structure comprises one or more of: a threshold of an impact sustainable by the target marine structure from the obstacle, a time interval required to cease the set operation conducted by the target marine structure; and a time interval required to move the target marine structure away from the threat of the obstacle.

17. The method of claim 1, wherein modelling with the computer system the one or more altered drift tracks of the obstacle for each of the active diversions comprises modeling with the computer system the one or more altered drift tracks of the obstacle drifting from one or more of the at least two different tow positions of the at least two different tow routes by using one or more different drift models applied to the one or more of the at least two different tow positions for calculating the passive drift of the obstacle over time.

18. The method of claim 17, wherein using the one or more different drift models for calculating the passive drift of the at least one obstacle comprises selecting the one or more different drift models from a plurality of available drift models.

19. The method of claim 18, wherein selecting the one or more different drift models comprises receiving a user selection of the one or more drift models from the available drift models.

20. The method of claim 1, wherein modeling with the computer system the at least two different tow routes of the obstacle over time relative to the target marine structure comprises predicting with the computer system at least one first threat to the target marine structure from at least one of the at least two different tow routes of the obstacle.

21. The method of claim 20, wherein modeling with the computer system the one or more altered drift tracks of the obstacle over time relative to the target marine structure comprises predicting with the computer system at least one second threat to the target marine structure from at least one of the one or more altered drift tracks of the obstacle.

22. A programmable storage device having program instructions stored thereon for causing a programmable control device to perform a marine threat monitoring method for a target marine structure according to claim 1.

23. A marine threat modelling system for a target marine structure conducting a set operation in a body of water, the system comprising:

memory storing information about an obstacles relative to the target marine structure, the memory storing one or more drift models and storing at least two different tow models for calculating an active diversion; and processing equipment operatively coupled to the memory and being configured to:

monitor a given position of the obstacle drifting relative to the target marine structure;

model at least two different tow routes actively diverting the same obstacle over time from the given position to at least two different tow positions relative to the target marine structure by using the at least two different tow models for calculating the active diversion of the same obstacle in each of the at least two different tow routes;

modelling with the computer system one or more altered drift tracks of the obstacle for each of the active diversions by using one or more drift models for calculating a passive drift of the obstacle over time form the at least two different tow positions of each of the active diversions;

present the at least two different tow routes and the one or more altered drift tracks for each of the active diversions for comparison to one another; and initiate a tow operation to actively divert the obstacle based on the comparison.

24. The system of claim 23, wherein to monitor the given position of the obstacle, the processing equipment is configured to model one or more given drift tracks of the obstacle by using one or more drift models for calculating a passive drift of the obstacle over time to determine the given position.

25. The system of claim 24, wherein in modeling the one or more given drift tracks of the obstacle over time relative to the target marine structure, the processing equipment is configured to predict at least one threat to the target marine structure from at least one of the one or more given drift tracks of the obstacle.

26. The system of claim 23, wherein in modelling with the computer system the one or more altered drift tracks of the obstacle for each of the active diversions, the processing equipment is configured to model the one or more altered drift tracks of the obstacle drifting from one or more of the at least two different tow positions of the at least two different tow routes by using one or more different drift models applied to the one or more of the at least two different tow positions for calculating the passive drift of the obstacle over time.

* * * * *